United States Patent
Ohtani et al.

(10) Patent No.: US 11,477,309 B2
(45) Date of Patent: Oct. 18, 2022

(54) HANDS-FREE DEVICE, DATA TRANSFER METHOD, AND RECORDING MEDIUM

(71) Applicant: Panasonic Intellectual Property Management Co., Ltd., Osaka (JP)

(72) Inventors: Masayoshi Ohtani, Kanagawa Ken (JP); Hideyo Fukushima, Kanagawa Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/197,901

(22) Filed: Mar. 10, 2021

(65) Prior Publication Data
US 2021/0289062 A1   Sep. 16, 2021

(30) Foreign Application Priority Data
Mar. 16, 2020   (JP) .............................. JP2020-045827

(51) Int. Cl.
    *H04M 1/00*   (2006.01)
    *H04M 1/60*   (2006.01)
    *H04M 1/57*   (2006.01)

(52) U.S. Cl.
    CPC ............ *H04M 1/006* (2013.01); *H04M 1/575* (2013.01); *H04M 1/6075* (2013.01); *H04M 2203/551* (2013.01); *H04M 2250/60* (2013.01)

(58) Field of Classification Search
    CPC .... H04M 1/006; H04M 1/575; H04M 1/6075; H04M 2203/551; H04M 2250/60;
    (Continued)

(56) References Cited

U.S. PATENT DOCUMENTS

2002/0032048 A1   3/2002   Kitao et al.
2003/0115335 A1*  6/2003   Yoshida ................. H04M 3/48
                                                 709/228
(Continued)

FOREIGN PATENT DOCUMENTS

EP   2184907 A1 *   5/2010  ...... H04M 1/274516
JP   2002-193046    7/2002
(Continued)

OTHER PUBLICATIONS

Alsibai, Mohammed Hayyan, and Hoon Min Siang. "A smart driver monitoring system using android application and embedded system." 2015 IEEE International Conference on Control System, Computing and Engineering (ICCSCE). IEEE, 2015. (Year: 2015).*

(Continued)

*Primary Examiner* — Sharad Rampuria
(74) *Attorney, Agent, or Firm* — Greenblum & Bernstein, P.L.C.

(57) ABSTRACT

A hands-free device is disclosed, in which a memory and a hardware processor connected to the memory are included. The hardware processor establishes a connection with a mobile phone using a hands-free communication protocol for making a hands-free call. The hardware processor establishes a connection with the mobile phone using a data transfer protocol for transferring phone data about a phone to receive the phone data transferred from the mobile phone, and stores the phone data into the memory. When a phone communication state of the mobile phone is transitioned while the phone data is being transferred, the hardware processor executes transfer control in accordance with transfer criteria, each depending on a type of the phone data being transferred and the phone communication state after the transition.

12 Claims, 13 Drawing Sheets

(58) Field of Classification Search
CPC ........... H04M 1/2757; H04M 2250/02; H04M 1/6091; H04M 3/54; H04M 2203/1091; H04M 2207/18; H04M 1/72412; H04M 1/6083; H04W 4/16; H04W 76/10; H04W 84/18; H04W 88/06; G06K 7/0008; G06K 19/0723; H04B 5/00; H04B 5/0012; H04B 5/02; B60R 11/0241

See application file for complete search history.

(56) References Cited

U.S. PATENT DOCUMENTS

| | | |
|---|---|---|
| 2007/0178944 A1 | 8/2007 | Mitsuru et al. |
| 2012/0094644 A1 | 4/2012 | Hayashi et al. |

FOREIGN PATENT DOCUMENTS

| | | |
|---|---|---|
| JP | 2010-087946 | 4/2010 |
| JP | 2012-089938 | 5/2012 |
| JP | 2012-100156 | 5/2012 |
| JP | 5541322 | 7/2014 |

OTHER PUBLICATIONS

Caceres, Noelia, et al. "Traffic flow estimation models using cellular phone data." IEEE Transactions on Intelligent Transportation Systems 13.3 (2012): 1430-1441. (Year: 2012).*

* cited by examiner

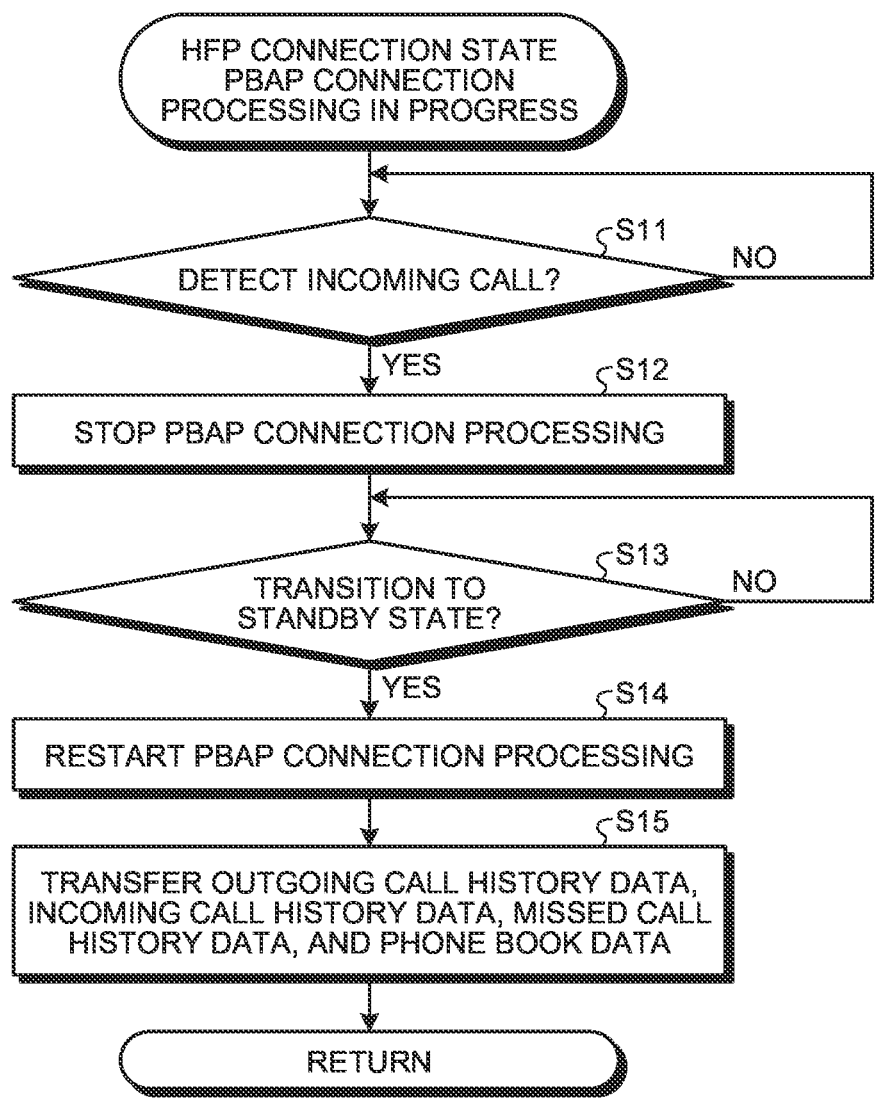

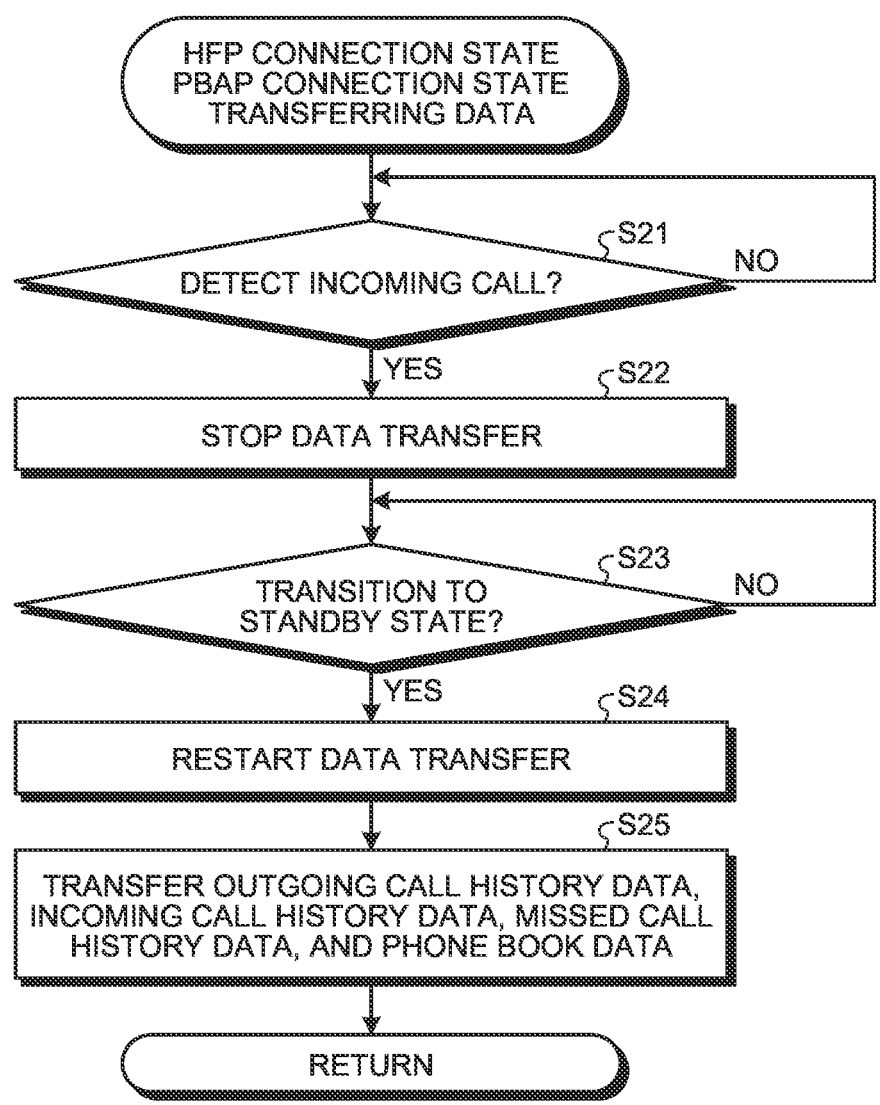

FIG.7

| PHONE COMMUNICATION STATE | MISSED CALL HISTORY DATA | INCOMING CALL HISTORY DATA | OUTGOING CALL HISTORY DATA | ALL HISTORY DATA | PHONE BOOK DATA |
|---|---|---|---|---|---|
| STANDBY STATE | TRANSFERABLE <1> | TRANSFERABLE <2> | TRANSFERABLE <3> | TRANSFERABLE <4> | TRANSFERABLE <5> |
| OUTGOING CALL STATE | TRANSFERABLE <3> | TRANSFERABLE <4> | NON-TRANSFERABLE <1> | NON-TRANSFERABLE <5> | TRANSFERABLE <2> |
| INCOMING CALL STATE | NON-TRANSFERABLE <3> | NON-TRANSFERABLE <4> | TRANSFERABLE <1> | NON-TRANSFERABLE <5> | TRANSFERABLE <2> |
| ON-CALL STATE | TRANSFERABLE <3> | SWITCHING AT TRANSITION SOURCE <4> | SWITCHING AT TRANSITION SOURCE <1> | TRANSFERABLE <5> | TRANSFERABLE <2> |

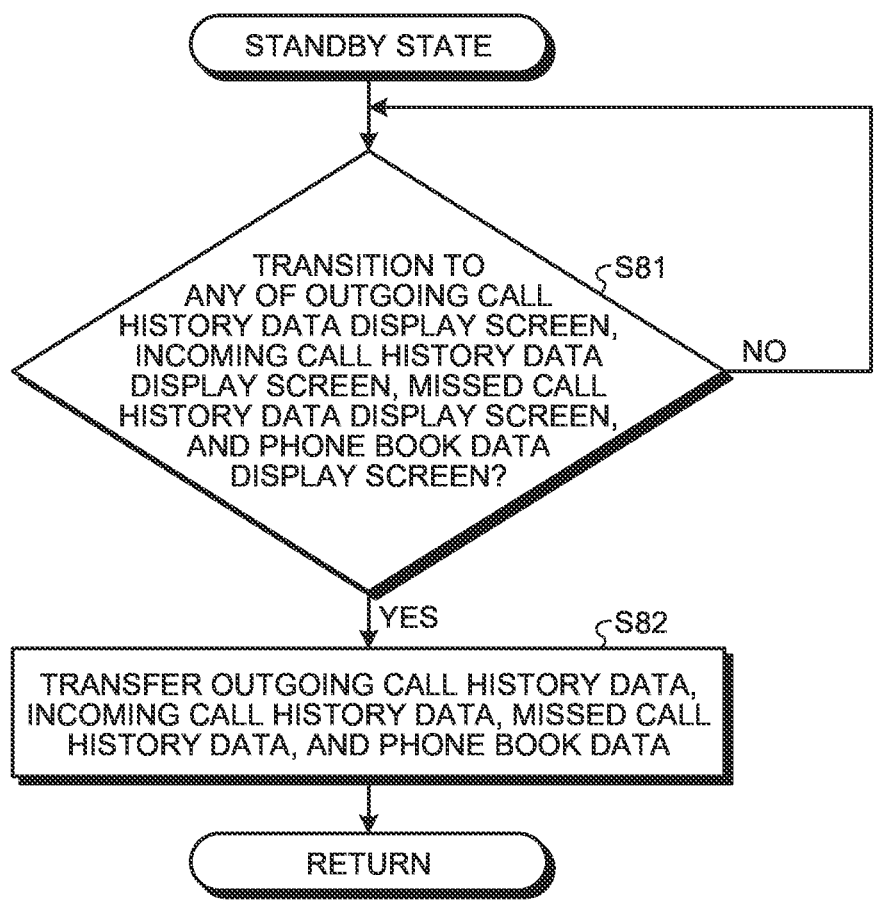

HANDS-FREE DEVICE, DATA TRANSFER METHOD, AND RECORDING MEDIUM

CROSS-REFERENCE TO RELATED APPLICATIONS

This application is based upon and claims the benefit of priority from Japanese Patent Application No. 2020-045827, filed on Mar. 16, 2020, the entire contents of which are incorporated herein by reference.

FIELD

The present disclosure relates to a hands-free device, a data transfer method, and a recording medium.

BACKGROUND

A configuration has been known in which phone data such as phone book data and call history data is automatically transferred from a mobile phone to a hands-free device. For example, a technique is disclosed in which a communication line is established between a mobile phone and a hands-free device located within a short-range communication range, and phone data is automatically transferred from the mobile phone to the hands-free device (see, for example, Japanese Laid-open Patent Publication No. 2002-193046).

However, with the conventional technique, when a phone communication state of the mobile phone is transitioned during the transfer of the phone data, consistency of the phone data might be difficult to efficiently maintain between the hands-free device and the mobile phone.

SUMMARY

A hands-free device according to the present disclosure includes a memory and a hardware processor connected to the memory. The hardware processor is configured to: establish a connection with a mobile phone using a hands-free communication protocol for making a hands-free call; establish a connection with the mobile phone using a data transfer protocol for transferring phone data about a phone to receive the phone data transferred from the mobile phone, and store the phone data into the memory; and, when a phone communication state of the mobile phone is transitioned while the phone data is being transferred, execute transfer control in accordance with transfer criteria, each depending on a type of the phone data being transferred and the phone communication state after the transition.

BRIEF DESCRIPTION OF THE DRAWINGS

FIG. 5 is a flowchart illustrating a flow of processing executed when an incoming call occurs during a concurrent connection state according to the embodiment;

FIG. 6 is a flowchart illustrating a flow of processing executed when an incoming call occurs while phone data is being transferred during the concurrent connection state according to the embodiment;

FIG. 7 is a schematic diagram illustrating an example of a data structure of transfer management data according to the embodiment;

FIG. 15 is a flowchart illustrating a flow in a case where data transfer is triggered by an operation performed on an operation unit by a user according to the embodiment.

DETAILED DESCRIPTION

Figure 1:
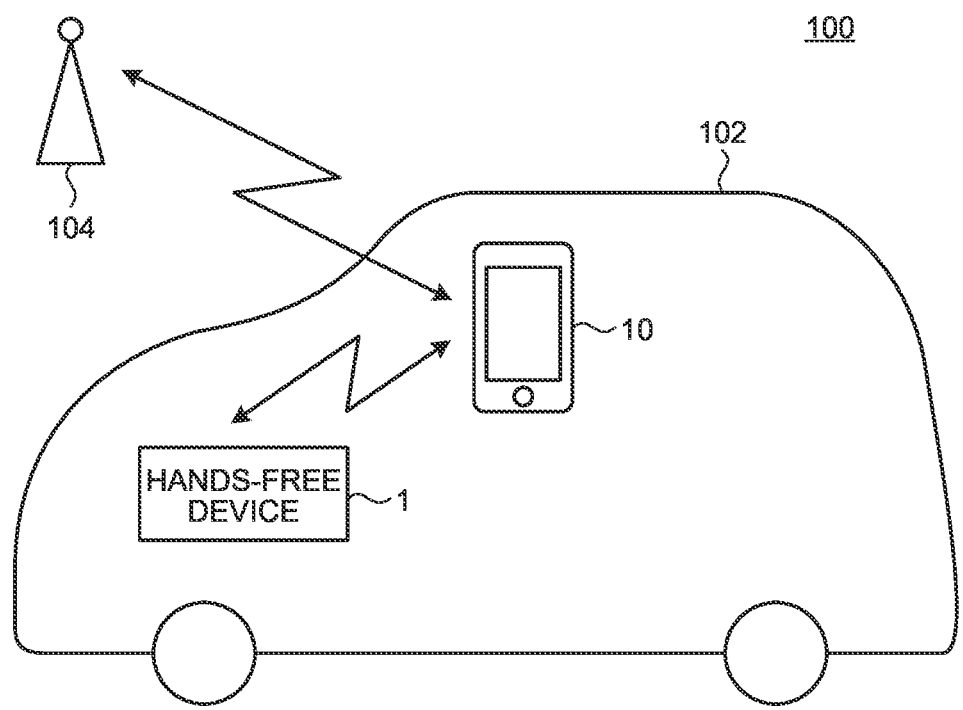
FIG. 1 is a schematic view of a hands-free system according to an embodiment.

Embodiments of the present disclosure will be described below in detail with reference to the drawings. In each of the following embodiments, the same parts are designated by the same reference numerals, and redundant description will be omitted.

FIG. 1 is a schematic view illustrating an example of a hands-free system 100 of the present embodiment.

The hands-free system 100 includes a hands-free device 1 and a mobile phone 10. The hands-free device 1 and the mobile phone 10 are connected to each other by wireless communications. The mobile phone 10 can communicate with a phone such as another mobile phone 10 over a phone line via a base station 104.

In the present embodiment, a mode in which the hands-free device 1 is installed in a vehicle 102 will be described as an example. The hands-free device 1 is not limited to the mode of being installed in the vehicle 102.

Figure 2:
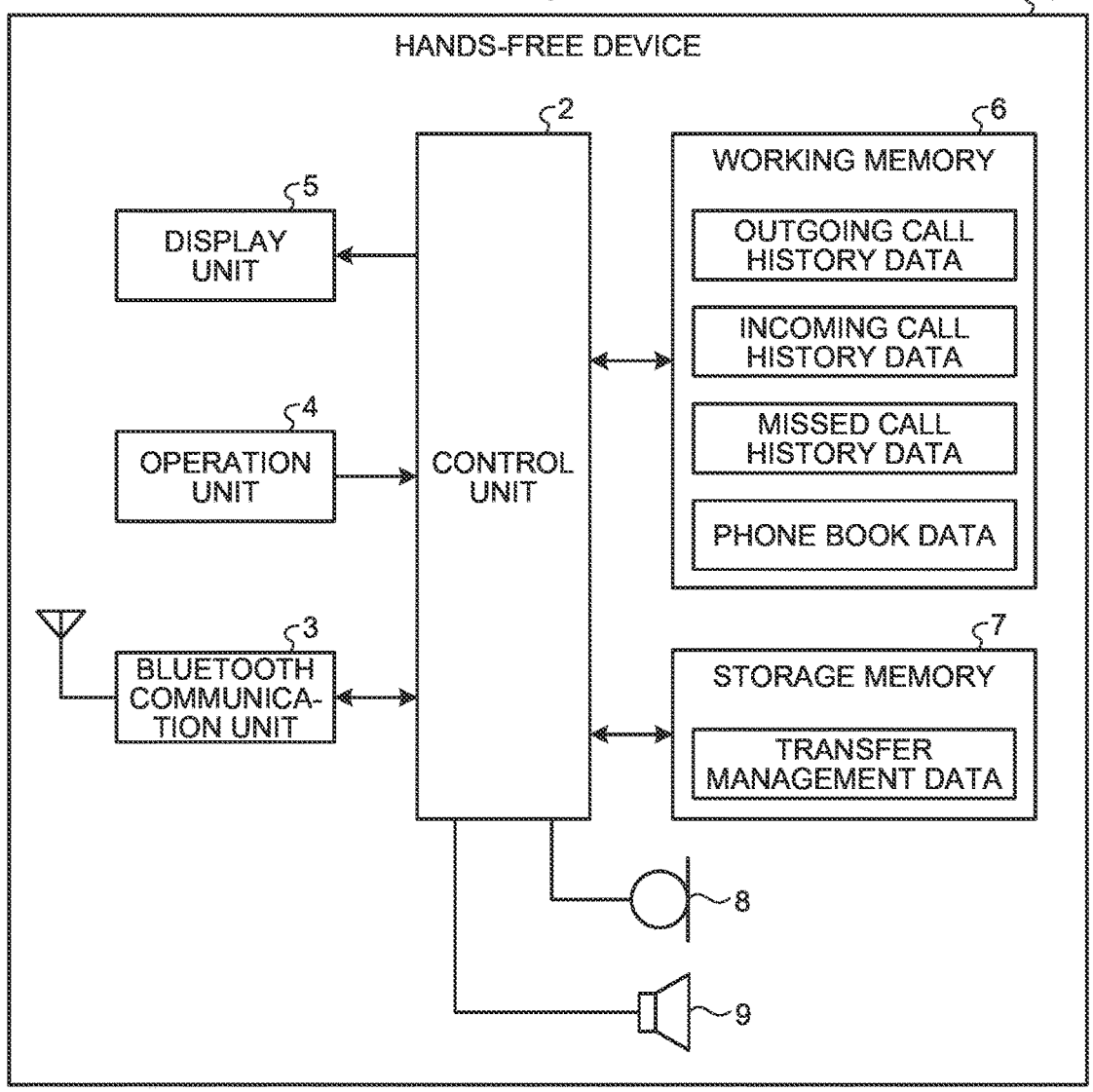
FIG. 2 is a block diagram of the hands-free system according to the embodiment.

FIG. 2 is a block diagram of the hands-free system 100.

The mobile phone 10 establishes a mobile phone line with the base station 104 of a mobile phone network, and executes outgoing call processing and incoming call processing.

The outgoing call processing refers to processing to make a call to a call destination with a phone number input and received. For example, a case is assumed where a user has operated dial keys (numerical keys from "0" to "9") to input a phone number as a call destination, and then operated a call key. In this case, the mobile phone 10 executes outgoing call processing to make a call to the call destination which is the phone number input and received. With the outgoing call processing, the mobile phone 10 can make a call to another mobile phone 10 that is the call destination.

The incoming call processing refers to processing to receive an incoming call from another mobile phone 10. For example, the mobile phone 10 receives an incoming call signal from the base station 104 in response to an outgoing call from another mobile phone 10. The mobile phone 10 receives the phone number of another mobile phone 10 (caller) as an incoming call phone number. Then, the mobile phone 10 executes the incoming call processing to answer the mobile phone 10 that is the caller, in response to an operation on a call reception key by the user. With the incoming call processing, the mobile phone 10 can be in a call with another mobile phone 10 that is the caller.

The mobile phone 10 stores phone data about a phone. The phone data includes at least one of outgoing call history data, incoming call history data, missed call history data, and phone book data.

The outgoing call history data refers to data representing an outgoing call history of a phone. Specifically, the outgoing call history data is one or a plurality of pieces of data each having an outgoing call phone number and an outgoing call date and time associated with each other. The mobile phone 10 has a clock unit that measures time to obtain date and time. The mobile phone 10 stores a plurality of pieces of outgoing call history data each having an outgoing call phone number and an outgoing call date and time associated with each other. The outgoing call phone number is the phone number received through the outgoing call processing using the dial keys. The outgoing call date and time is the date and time measured by the clock unit during the outgoing call processing.

The incoming call history data refers to data representing an incoming call history of a phone. Specifically, the incoming call history data is one or a plurality of pieces of data each having an incoming call phone number and an incoming call date and time associated with each other. The mobile phone 10 stores a plurality of pieces of incoming call history data each having an incoming call phone number and an incoming call date and time associated with each other. The incoming call phone number is a phone number received from another mobile phone 10 via the base station 104 in the incoming call processing. The incoming call date and time is the date and time measured by the clock unit when the incoming call processing is executed.

The missed call history data is data representing a history of incoming calls from another mobile phone 10 that have not been answered. Specifically, the missed call history data is one or a plurality of pieces of data each having an incoming call phone number and an incoming call date and time associated with each other. The mobile phone 10 stores a plurality of pieces of missed call history data each having an incoming call phone number of an incoming call received from another mobile phone 10 but has not been answered and an incoming call date and time associated with each other.

The phone book data includes a plurality of pieces of data each having a phone number and a registered name associated with each other. The mobile phone 10 stores in a non-volatile memory, for example, about 500 pieces of data each having a phone number and a registered name input by the user associated with each other.

The phone data may include all history data in which the outgoing call history data, the incoming call history data, and the missed call history data are integrated. In the following description, the outgoing call history data, the incoming call history data, the missed call history data, and the all history data may be simply and collectively referred to as history data. The history data may not include the all history data.

The outgoing call history data, the incoming call history data, and the missed call history data may further include a registered name.

The mobile phone 10 determines whether the incoming call phone number received from the base station 104 has been registered in the phone book data. When the phone number has been registered, the mobile phone 10 stores incoming call history data in which the registered name corresponding to this phone number is associated with the phone number and the incoming call date and time. Similarly, the mobile phone 10 that did not answer an incoming call from another mobile phone 10 may store missed call history data in which the registered name is associated with the incoming call phone number and the incoming call date and time. The mobile phone 10 determines whether the outgoing call phone number has been registered in the phone book data. When the phone number has been registered, the mobile phone 10 stores outgoing call history data in which the registered name corresponding to this phone number is associated with the phone number and the outgoing call date and time.

Upon receiving a read instruction issued by an operation by the user, the mobile phone 10 displays the phone book data. The mobile phone 10 receives selection of one of a plurality of phone numbers included in the phone book data, and receives an outgoing call instruction. The mobile phone 10 executes the outgoing call processing with the selected phone number being the call destination. Thus, the user needs not to input each and every numbers constituting the phone number using the keys, whereby the outgoing call processing can be executed with a simple operation and without a risk of calling a wrong number.

The mobile phone 10 can store, for example, the latest 20 pieces of each of the outgoing call history data, the incoming call history data, and the missed call history data. The mobile phone 10 updates these data by automatically deleting the oldest data each time the outgoing call processing, the incoming call processing, and the missed call processing are performed. The number of pieces of such data stored in the mobile phone 10 is not limited to 20.

In the present embodiment, the mobile phone 10 has a short-range wireless communication function. In the present embodiment, the mobile phone 10 performs short-range wireless communication supporting Bluetooth (registered trademark) as a wireless communication standard. The mobile phone 10 is connected to and communicates with the hands-free device 1, by using a profile such as a hands-free profile and a phone book access profile. The hands-free profile will be hereinafter referred to as HFP (Hands Free Profile). The phone book access profile will be hereinafter referred to as PBAP (Phone Book Access Profile).

The HFP is a hands-free communication protocol for performing hands-free communications, and is a profile defined by a wireless communication standard. The PBAP is a data transfer protocol for transferring phone data, and is a profile defined by a wireless communication standard. These profiles represent a communication protocol defined for each function.

The PBAP is an example of a data transfer protocol for performing data transfer, and is a profile defined by the Bluetooth standard. The PBAP is a profile that enables automatic transferring of phone data from the mobile phone 10 to the hands-free device 1 after a PBAP connection has been established, without the need for the user to perform any operation on the mobile phone 10. Thus, the mobile phone 10 is configured to be capable of automatically transferring phone data to the hands-free device 1.

For example, the mobile phone 10 establishes the PBAP connection immediately after establishing a communication line with the hands-free device 1, and automatically transfers the phone data stored at that point to the hands-free device 1. With this configuration, when the mobile phone 10 is in a Bluetooth communication range of the hands-free device 1, the phone data (phone book data, outgoing call history data, incoming call history data, and missed call history data) is automatically transferred to the hands-free device 1.

Next, the hands-free device 1 will be described.

The hands-free device 1 includes a control unit 2, a Bluetooth communication unit 3, an operation unit 4, a display unit 5, a working memory 6, a storage memory 7, a microphone 8, and a speaker 9.

The control unit 2 is connected to the Bluetooth communication unit 3, the operation unit 4, the display unit 5, the working memory 6, the storage memory 7, the microphone 8, and the speaker 9, and is capable of exchanging data and signal between them.

The control unit 2 controls all operations of the hands-free device 1 such as a communication operation and a data management operation. The details of the control unit 2 will be described later.

The Bluetooth communication unit 3 is a wireless communication device that performs short-range wireless communications. In the present embodiment, the Bluetooth communication unit 3 performs short-range wireless communications supporting Bluetooth as a wireless communication standard. In the present embodiment, the Bluetooth communication unit 3 establishes a wireless communication line with the mobile phone 10 in the Bluetooth communication range, and performs communications supporting the Bluetooth communication standard.

The Bluetooth communication unit 3 is connected to and communicates with the mobile phone 10 using profiles such as the HFP, which is a hands-free communication protocol for performing hands-free communications, and the PBAP, which is a data transfer protocol for transferring phone data.

In addition, the Bluetooth communication unit 3 is configured to be capable of establishing multi-profile connection. Thus, the Bluetooth communication unit 3 can be connected to the mobile phone 10 using both the HFP and PBAP simultaneously.

The multi-profile connection may be referred to as concurrent connection. With Bluetooth, up to seven slave communication devices can be concurrently connected to one master communication device by time division multiplexing. Thus, communications can be performed using seven independent time-division communication channels. In this case, concurrent connection is established using two of the seven communication channels, with one of the two communication channels used for the HFP, and the other one used for the PBAP. Furthermore, a logical channel of one communication channel may be shared by the HFP and the PBAP and operated simultaneously, as in packet communications.

The operation unit 4 receives an input from the user. The operation unit 4 is formed of, for example, touch keys formed on the display unit 5, receives an operation signal representing a content of an operation performed by the user, and outputs the signal to the control unit 2.

The display unit 5 displays a display screen based on a display signal received from the control unit 2. For example, the display unit 5 displays a display screen for receiving a phone number input from the user. This display screen is, for example, a screen in which dial keys corresponding to "0" to "9" are arranged.

The working memory 6 stores various types of data. In the present embodiment, the working memory 6 stores the phone book data, the outgoing call history data, the incoming call history data, and the missed call history data, which are phone data automatically transferred from the mobile phone 10. The working memory 6 can store, for example, five pieces of each of the outgoing call history data, the incoming call history data, and the missed call history data. The number of pieces of such data that can be stored in the working memory 6 is not limited to five. The working memory 6 is, for example, a volatile memory.

The storage memory 7 stores various types of data. In the present embodiment, the storage memory 7 stores transfer management data in advance. Details of the transfer management data will be described later. The storage memory 7 is formed of, for example, a non-volatile memory.

The microphone 8 receives a voice input made by the user to make a hands-free call using the mobile phone 10. The speaker 9 outputs the received voice from the call counterpart when a hands-free call is made using the mobile phone 10.

The hands-free device 1 may further include various configurations required for a navigation operation. For example, the hands-free device 1 may include a Global Positioning System (GPS), a route search unit, a map data reading unit, an information receiver compliant with a transport system, such as a Vehicle Information and Communication System (VICS (registered trademark)) in Japan, a voice recognition unit, and the like.

The GPS is a system that detects the current position of the host vehicle. The route search unit is a system that searches for a route from the current position to the destination. The map data reading unit is a system that reads map data from a recording medium. In a case that the VICS described above is applied to the transport system, the information receiver receives VICS information distributed from a VICS center. The voice recognition unit is a system that recognizes the voice from the user.

The hands-free device 1 is configured to supply power and stop the power supply in response to turning ON/OFF of accessory power supply (ACC) switch of the vehicle 102, for example. For example, the ACC switch is assumed to be switched from ON to OFF in response to the user operation. In this case, the power supply to the hands-free device 1 is stopped. When the power supply is stopped, the outgoing call history data, the incoming call history data, the missed call history data, and the phone book data stored in the working memory 6 are deleted. On the other hand, various types of data such as the transfer management data stored in the storage memory 7 are not deleted and thus remain to be stored even after the power supply is stopped.

Next, the details of the control unit 2 will be described.

Figure 3:
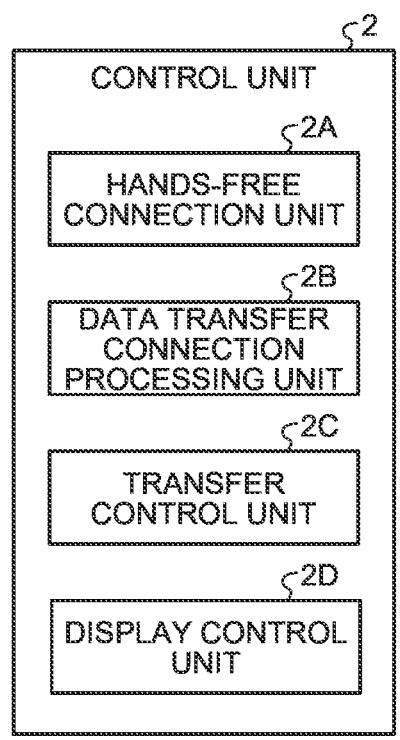
FIG. 3 illustrates an example of a functional block diagram of a control unit according to the embodiment.

FIG. 3 is an example of a functional block diagram of the control unit 2. The control unit 2 includes a hands-free connection unit 2A, a data transfer connection processing unit 2B, a transfer control unit 2C, and a display control unit 2D.

The hands-free connection unit 2A, the data transfer connection processing unit 2B, the transfer control unit 2C, and the display control unit 2D are implemented by, for example, one or a plurality of processors. For example, each of the above units may be implemented by that a hardware processor such as a central processing unit (CPU) executes a computer program, that is, software. Each of the above-described units may be implemented by a processor such as a dedicated integrated circuit (IC), that is, may be implemented by hardware. Each of the above units may be implemented by a combination of software and hardware. When a plurality of processors is used, each of the plurality of processors may implement one of the plurality of units, or may implement two or more of the plurality of units.

The processor implements each of the plurality of units described above by reading and executing a program stored in the storage memory 7. Instead of storing the program in the storage memory 7, the program may be directly embedded in the circuit of the processor. In this case, the processor implements each of the plurality of units described above by reading and executing the program embedded in the circuit.

The hands-free connection unit 2A executes hands-free connection processing to connect with the mobile phone 10 using the HFP. The hands-free connection processing is processing to establish a connection with the mobile phone 10 using the HFP. Thus, the hands-free connection unit 2A establishes the HFP connection between the hands-free device 1 and the mobile phone 10.

Once the HFP connection is established, the hands-free device 1 can make a hands-free call via the mobile phone 10. Specifically, the hands-free connection unit 2A transmits the voice, received from the microphone 8, to the mobile phone 10 via the Bluetooth communication unit 3. The mobile phone 10 transmits the voice received from the hands-free device 1 to the mobile phone 10 with the phone number of the call destination, via the base station 104. Furthermore, the hands-free connection unit 2A receives the voice received by the mobile phone 10 from another mobile phone 10 via the Bluetooth communication unit 3, and outputs the voice to the speaker 9. Thus, a hands-free call can be made with the hands-free device 1.

The data transfer connection processing unit 2B executes data transfer processing to connect with the mobile phone 10 using the PBAP and receiving phone data transferred from the mobile phone 10. The data transfer connection processing unit 2B establishes a PBAP connection with the mobile phone 10 via the Bluetooth communication unit 3. Once the PBAP connection is established, the phone data from the mobile phone 10 is automatically transferred to the hands-free device 1. The automatic transfer means that data is transferred between the hands-free device 1 and the mobile phone 10 without any operation performed by the user. In the following, the automatic transfer of phone data from the mobile phone 10 to the hands-free device 1 may be referred to as acquisition of phone data by the hands-free device 1.

When the PBAP connection is established, the data transfer connection processing unit 2B sequentially transmits transfer requests for the history data such as the outgoing call history data, the incoming call history data, and the missed call history data, to the mobile phone 10. The mobile phone 10 transfers, to the hands-free device 1, the history data corresponding to the transfer request received from the hands-free device 1. The data transfer connection processing unit 2B transmits a transfer request for the phone book data to the mobile phone 10. The mobile phone 10 transmits, to the hands-free device 1, the phone book data in response to the transfer request received from the hands-free device 1. With these processes, the phone data is automatically transferred from the mobile phone 10 to the hands-free device 1.

The transfer control unit 2C executes transfer control related to the transfer of the phone data. The transfer control is a control for receiving the phone data transferred from the mobile phone 10. The transfer control unit 2C controls the transmission timing of the transfer request transmitted from the data transfer connection processing unit 2B to the mobile phone 10, the type of the transfer request to be transmitted, whether the transfer should continue, cancellation of the transfer, and the like. The type of transfer request to be transmitted is the type of phone data for which transfer has been requested. Types of phone data refers to the outgoing call history data, the incoming call history data, the missed call history data, the all history data, and the phone book data.

By controlling these, the transfer control unit 2C performs transfer control to control the transfer of phone data by the data transfer connection processing unit 2B. With the transfer control by the transfer control unit 2C, the type of phone data transferred from the mobile phone 10 to the hands-free device 1, the order of transfer, whether the transfer should continue, cancellation of transfer, and the like are controlled.

The transfer control unit 2C executes the transfer control in accordance with phone communication state of the mobile phone 10.

The phone communication state means a communication state between the mobile phone 10 and another mobile phone 10 over a phone line. Specifically, the phone communication state is any one of an outgoing call state, an incoming call state, an on-call state, and a standby state.

The outgoing call state is a state in which the mobile phone 10 is making a call with the phone number received being the call destination. The incoming call state is a state in which the mobile phone 10 is receiving an incoming call from another mobile phone 10. The on-call state is a state in which the mobile phone 10 and another mobile phone 10 are in voice communication via the base station 104, that is, the mobile phone 10 is in a state of being busy. The standby state means that the communication state over the phone line of the mobile phone 10 is none of the outgoing call state, the incoming call state, and the on-call state. In other words, the standby state means a state other than the on-call state, and is a state of waiting for an incoming call or an outgoing call.

The mobile phone 10 transitions from one phone communication state (one of the outgoing call state, the incoming call state, the on-call state, and the standby state) to another phone communication state, in accordance with the communications over the phone line. The mobile phone 10 notifies the hands-free device 1 of the phone communication state by means of the HFP each time a phone communication state is transitioned.

The transfer control unit 2C executes transfer control related to transfer based on the phone communication state received from the mobile phone 10. The transfer control unit 2C may transmit an inquiry request signal for the phone communication state to the mobile phone 10. Then, the transfer control unit 2C may acquire the phone communication state from the mobile phone 10 as a response signal for the inquiry request signal.

The transfer control by the transfer control unit 2C will be described in detail later.

The display control unit 2D outputs a display instruction to the display unit 5 to control the display unit 5 to display the display screen.

An example of a case is assumed where a display request for the outgoing call history data is received from the operation unit 4, in accordance with an operation by the user on the operation unit 4. In this case, the display control unit 2D outputs a display instruction for the outgoing call history data stored in the working memory 6, to the operation unit 4. Upon receiving the display instruction, the display unit 5 displays the outgoing call history data. For example, the display unit 5 displays up to five pieces of outgoing call history data.

An example of a case is assumed where a display request for the incoming call history data is received from the operation unit 4, in accordance with an operation by the user on the operation unit 4. In this case, the display control unit 2D outputs the display instruction for the incoming call history data stored in the working memory 6, to the operation unit 4. Upon receiving the display instruction, the display unit 5 displays the incoming call history data. For example, the display unit 5 displays up to five pieces of incoming call history data.

An example of a case is assumed where a display request for the missed call history data is received from the operation unit 4, in accordance with an operation by the user on the operation unit 4. In this case, the display control unit 2D outputs a display instruction for the missed call history data stored in the working memory 6, to the operation unit 4. Upon receiving the display instruction, the display unit 5 displays the missed call history data. For example, the display unit 5 displays up to five pieces of the missed call history data. An example of a case is assumed where a display request for the phone book data is received from the operation unit 4, in accordance with an operation by the user on the operation unit 4. In this case, the display control unit 2D outputs a display instruction for the phone book data stored in the working memory 6, to the operation unit 4. Upon receiving the display instruction, the display unit 5 displays the phone book data.

Next, operations and effects of the hands-free device 1 of the present embodiment will be described. In the present embodiment, a description is given assuming that the mobile phone 10 stores 20 pieces of each of the outgoing call history data and the incoming call history data, which is the maximum number of pieces of such data that can be stored. Furthermore, a description will be given assuming a case where the mobile phone 10 in this state enters the vehicle 102 while being held by the user or the like, to be in a Bluetooth communication range of the hands-free device 1.

In the present embodiment, it is assumed that the mobile phone 10 to be a communication counterpart of Bluetooth communications is registered in advance in the hands-free device 1. For example, with a four-digit password input for each mobile phone 10 at the time of initial communications, the hands-free device 1 generates a link key for each mobile phone 10. Then, the link key is stored in each of the mobile phone 10 and the hands-free device 1. In the hands-free device 1, the mobile phone 10 to be connected is selected through authentication of the link key at the time of initial connection. Thus, the mobile phone 10 not registered in the hands-free device 1 is not connected using the HFP or PBAP.

In the present embodiment, a description will be given assuming that a plurality of mobile phones 10 to be in communicative connection is registered in advance in the hands-free device 1. Furthermore, in the hands-free device 1, priority is set to each of the plurality of mobile phones 10 in advance. The priority may be set in advance by an operation on the operation unit 4 by the user or the like.

First of all, a flow of phone data transfer from the mobile phone 10 to the hands-free device 1 will be described.

Figure 4:
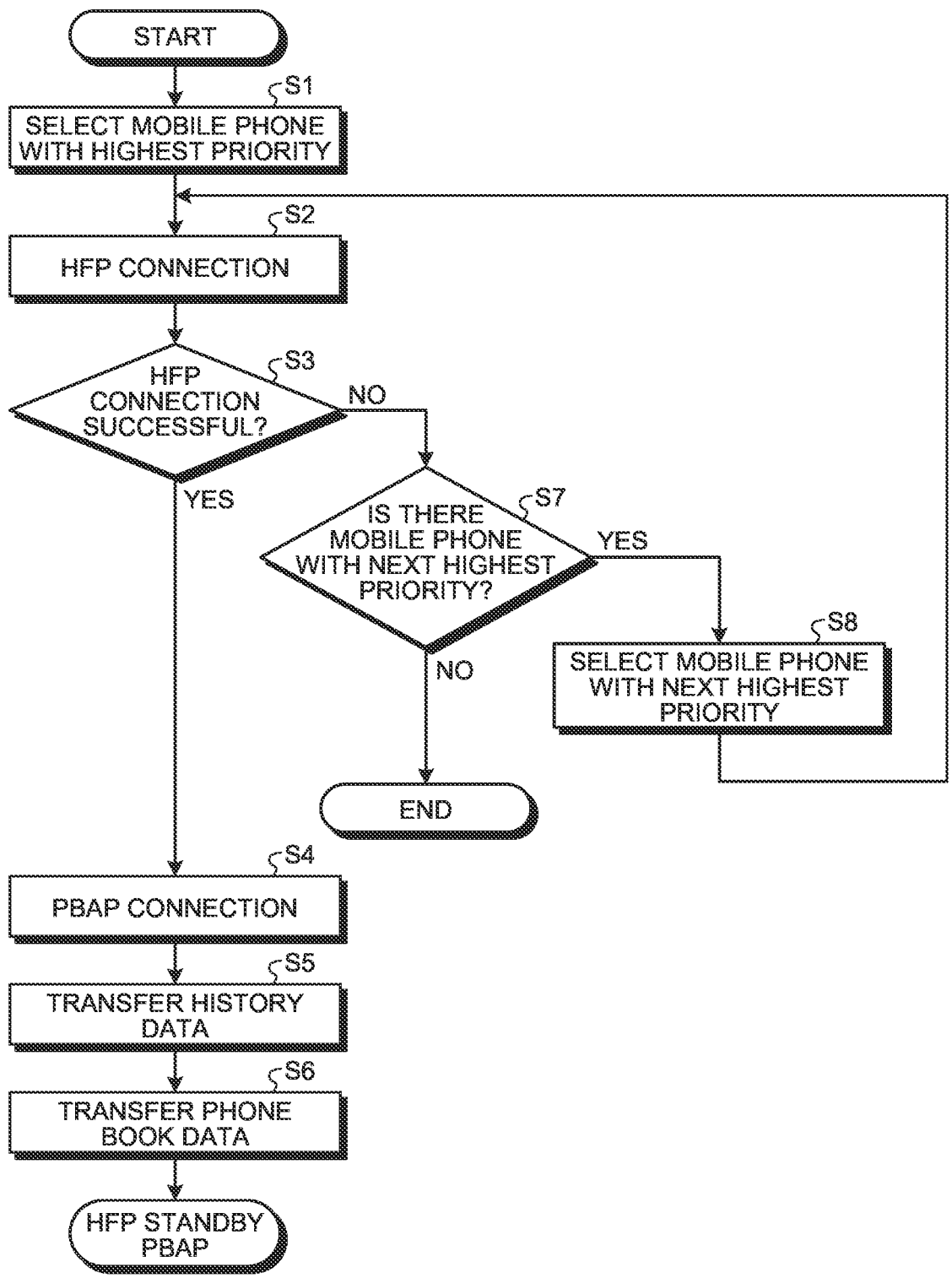
FIG. 4 is a flowchart illustrating a flow of phone data transfer processing according to the embodiment.

FIG. 4 is a flowchart illustrating an example of a flow of phone data transfer processing executed in the hands-free device 1.

The hands-free connection unit 2A selects the mobile phone 10 having the highest priority as the HFP connection target (step S1). The hands-free connection unit 2A establishes the HFP connection with the selected mobile phone 10 (step S2). With the process in step S2, the HFP connection is established between the hands-free device 1 and the mobile phone 10.

The hands-free connection unit 2A determines whether the HFP connection is successfully established (step S3). When the hands-free connection unit 2A determines that the HFP connection is successfully established (step S3: YES), the processing proceeds to step S4.

In step S4, the data transfer connection processing unit 2B establishes the PBAP connection with the mobile phone 10 with which the HFP connection has been determined to be successfully established in step S3 (step S4). In step S4, the data transfer connection processing unit 2B executes initial connection processing. The initial connection processing is connection processing for establishing a communication link used for data transfer using the PBAP.

Next, the transfer control unit 2C executes data transfer processing for history data (step S5). The transfer control unit 2C controls the data transfer connection processing unit 2B to sequentially transmit the transfer requests for the history data to the mobile phone 10 using the PBAP. The mobile phone 10 transmits the history data to the hands-free device 1 using the PBAP in response to the transfer request. With these processes, the history data is automatically transferred from the mobile phone 10 to the hands-free device 1.

When the history data transfer processing is completed, the transfer control unit 2C starts the transfer processing for the phone book data (step S6) and executes the transfer processing for the phone book data. The transfer control unit 2C controls the data transfer connection processing unit 2B to transmit the transfer request for the phone book data to the mobile phone 10 using the PBAP. The mobile phone 10 transmits the phone book data to the hands-free device 1 using the PBAP in response to the transfer request. With these processes, the phone book data is automatically transferred from the mobile phone 10 to the hands-free device 1.

On the other hand, in the above-described step S3, when the hands-free connection unit 2A determines that the HFP connection is not successfully established (step S3: No), the processing proceeds to step S7.

In step S7, the hands-free connection unit 2A determines whether there is a mobile phone 10 with the next highest priority (step S7). When the hands-free connection unit 2A determines that there is the mobile phone 10 with the next highest priority (step S7: Yes), the processing proceeds to step S8. When a result of the determination in step S7 is No (step S7: No), this routine ends.

In step S8, the mobile phone 10 having the next highest priority is selected as the HFP connection target (step S8). Then, the processing returns to step S2.

A case is assumed where the phone communication state of the mobile phone 10 is the standby state. In this case, the hands-free device 1 can execute the call processing and the outgoing call processing once the HFP connection is successfully established in step S2. Specifically, the hands-free device 1 becomes able to execute the call processing in which a call is made with the incoming call to the mobile phone 10 received using the operation unit 4, and also able to execute the outgoing call processing to make the mobile phone 10 execute an outgoing call in accordance with an operation on the operation unit 4. This state of the hands-free device 1 may be described below as a hands-free standby state.

With the process in step S4, the PBAP connection is established between the hands-free device 1 and the mobile phone 10. As a result of the processes in steps S2 to S4, the hands-free device 1 is in the concurrent connection state.

Therefore, when a wireless connection through Bluetooth is established as a result of the mobile phone 10 approaching the hands-free device 1, the data transfer is performed using the PBAP, and also the concurrent connection state is achieved with the HFP connection established, whereby the hands-free standby state of the hands-free device 1 is maintained.

The hands-free device 1 first only establishes the HFP connection with the mobile phone 10 in the Bluetooth communication range to establish the hands-free standby state, and then executes the PBAP initial connection processing.

Thus, even when the initial HFP and PBAP connections are concurrently established, the hands-free device 1 can suppress a load due to the concurrent processing and complexity of software due to the concurrent processing. Furthermore, with the hands-free device 1, the concurrent processing is executed so that the delay in the completion of the HFP connection can suppressed. Therefore, the hands-free device 1 can stably and reliably establish concurrent connection.

Furthermore, with the hands-free device 1, the HFP connection can be completed within a shorter period of time. Therefore, when the user carries the mobile phone 10 into a vehicle, a state can be swiftly achieved in which the outgoing call processing and the incoming call processing can be executed under HFP hands-free standby.

There may be a case where the mobile phone 10 detects an incoming call during the HFP-PBAP concurrent connection state between the hands-free device 1 and the mobile phone 10. In this case, the hands-free device 1 executes the following processing.

FIG. 5 is a flowchart illustrating an example of a flow of processing executed when the mobile phone 10 receives an incoming call during the concurrent connection state. The concurrent connection state is the state at the point of step S4 in FIG. 4.

The transfer control unit 2C determines whether an incoming call has been detected by the mobile phone 10 when the PBAP connection processing is being executed with the HFP connection state achieved (corresponding to the processing in S4) (step S11). When the mobile phone 10 is determined to have detected the incoming call (step S11: Yes), the processing proceeds to step S12.

In step S12, the transfer control unit 2C stops the PBAP connection processing by the data transfer connection processing unit 2B (step S12).

Next, the transfer control unit 2C determines whether transition to the standby state has occurred as a result of termination of the incoming call state due to the incoming call detected in step S11 or the on-call state due to the incoming call (step S13). The transfer control unit 2C makes the determination in step S13 by determining whether the phone communication state notified from the mobile phone 10 using the HFP indicates a transition from the outgoing call state or the on-call state to the standby state.

When it is determined that the transition to the standby state has occurred (step S13: Yes), the processing proceeds to step S14. The transition to the standby state is determined in step S13 when, for example, the following case is detected: a case that the hands-free device 1 rejects the incoming call for example; a case that the mobile phone 10 on the caller side cancels the outgoing call for example; or a case that the call between the mobile phones 10 ends.

In step S14, the transfer control unit 2C restarts the PBAP connection processing from the top (step S14), and again receives phone data transferred from the mobile phone 10 (step S15).

With this flow, the following effects can be obtained even when the mobile phone 10 receives an incoming call while the PBAP connection processing is in progress. Specifically, the transfer control unit 2C restarts the PBAP connection processing from the top, after the transition to the standby state has occurred due to the termination of the incoming call state or the on-call state related to the incoming call. Thus, the outgoing call history data, the incoming call history data, the missed call history data, and the phone book data can be appropriately acquired from the mobile phone 10. Thus, the consistency between these pieces of phone data and the ones stored in the mobile phone 10 can be maintained.

In the described mode, the PBAP connection starts from the top in S14 when the incoming call state transitions to the standby state. This is due to the following reasons.

Specifically, when the incoming call state is detected, new incoming call history data is generated in the mobile phone 10. The PBAP initial connection processing may start when the incoming call state is detected. However, when the initial connection processing is executed and the data transfer starts while the incoming call is still being received, whether the incoming call has been missed or answered is unknown. Thus, if data about the incoming call is received in this state, whether the incoming call has been missed or answered cannot be determined in the hands-free device 1. Thus, the transfer control unit 2C may redo the PBAP initial connection processing and the data transfer from the top, at a timing when the transition from the incoming call state to another state occurs.

The phone communication state of the mobile phone 10 ultimately transitions to the standby state. Thus, in the described mode, the processing proceeds to step S14 when the transition to the standby state is determined to have occurred in step S13. In step S13, the processing may also proceed to step S14, when the transition from the incoming call state to the on-call state is determined to have occurred.

On the other hand, there may be a case where the mobile phone 10 detects an incoming call while the HFP and PBAP concurrent connection state is achieved between the hands-free device 1 and the mobile phone 10 and while the phone data is being transferred.

In this case, the hands-free device 1 executes the following processing.

FIG. 6 is a flowchart illustrating an example of a flow of processing executed when the mobile phone 10 receives an incoming call while the phone data is being transferred in the concurrent connection state. The state in any of steps S5 and S6 in FIG. 4 and step S15 in FIG. 5 corresponds to the case where the phone data is being transferred in the concurrent connection state.

The transfer control unit 2C determines whether the mobile phone 10 has detected an incoming call while phone data is being transferred (step S21). When the mobile phone 10 is determined to have detected the incoming call (step S21: Yes), the processing proceeds to step S22.

In step S22, the transfer control unit 2C stops the transfer of phone data by the data transfer connection processing unit 2B (step S22).

Next, the transfer control unit 2C determines whether transition to the standby state has occurred as a result of termination of the incoming call state due to the incoming call detected in step S21 or the on-call state due to the incoming call (step S23). The transfer control unit 2C makes the determination in step S23 by determining whether the phone communication state notified from the mobile phone 10 using the HFP indicates a transition from the outgoing call state or the on-call state to the standby state.

When it is determined that the transition to the standby state has occurred (step S23: Yes), the processing proceeds to step S24.

In step S24, the transfer control unit 2C restarts the phone data transfer from the top (step S24), and again receives phone data transferred from the mobile phone 10 (step S25).

With this flow, the following effects can be obtained even when the mobile phone 10 receives an incoming call while phone data is being transferred. Specifically, the transfer control unit 2C restarts the phone data transfer processing from the top, after the transition to the standby state has occurred due to the termination of the incoming call state or the on-call state due to the incoming call. Thus, the outgoing call history data, the incoming call history data, the missed call history data, and the phone book data can be appropriately acquired from the mobile phone 10. Thus, the consistency between these pieces of phone data and the ones stored in the mobile phone 10 can be maintained.

The following problem might occur when the phone data transfer processing is restarted from the top after the transition to the standby state in a case where the mobile phone 10 receives an incoming call during the concurrent connection state or during the transfer of the phone data in the concurrent connection state. Thus, the flow of the processing described above with reference to FIGS. 5 and 6 is merely an example, and the processing described below can be executed through a change in a mode setting or the like for example.

Specifically, when the phone data transfer processing is restarted from the top, the transfer may take some time due to an occurrence of overhead. In addition, it may take some time to display the phone data on the display unit 5. Furthermore, it may be inefficient to restart the phone data transfer processing from the top after the transition to the standby state, regardless of the type of the phone data being transferred or the phone communication state.

Therefore, in the present embodiment, the transfer control unit 2C executes the following transfer control. The definition of transfer control has been described above, and thus will not be described herein.

When the phone communication state of the mobile phone 10 transitions while the phone data is being transferred, the transfer control unit 2C executes transfer control for transfer suitable for the phone data being transferred and the phone communication state after the transition.

The state transition of phone communication refers to a fact that the phone communication state of the mobile phone 10 which is any of the outgoing call state, the incoming call state, the on-call state, and the standby state transitions to another phone communication state.

For example, the transfer control unit 2C executes transfer control including at least stopping the transfer of the outgoing call history data when a phone communication state of the mobile phone 10 is transitioned to the outgoing call state while the phone data including the outgoing call history data is being transferred. The transfer control unit 2C executes the transfer control by controlling the data transfer connection processing unit 2B to stop the transfer of the outgoing call history data from the mobile phone 10.

The transfer control unit 2C may execute the transfer control to continue the transfer of the phone data when a phone communication state of the mobile phone 10 is transitioned to a state other than the outgoing call state while the phone data including the outgoing call history data is being transferred. The transfer control unit 2C executes the transfer control by controlling the data transfer connection processing unit 2B to continue the transfer of the phone data from the mobile phone 10.

Furthermore, when a phone communication state of the mobile phone 10 is transitioned to the incoming call state while the phone data including at least one of the incoming call history data and the missed call history data is being transferred, the transfer control unit 2C may execute transfer control in which transfer of at least one of the incoming call history data and the missed call history data is stopped. The transfer control unit 2C executes the transfer control by controlling the data transfer connection processing unit 2B to stop the transfer of at least one of the incoming call history data and the missed call history data from the mobile phone 10.

The transfer control unit 2C may execute transfer control to continue the transfer of the phone data when a phone communication state of the mobile phone 10 is transitioned to a state other than the incoming call state while the phone data including at least one of the incoming call history data and the missed call history data is being transferred. The transfer control unit 2C executes the transfer control by controlling the data transfer connection processing unit 2B to continue the transfer of the phone data from the mobile phone 10. Furthermore, when a phone communication state of the mobile phone 10 is transitioned to the outgoing call state while the phone data is being transferred, the transfer control unit 2C may execute the transfer control to transfer at least the outgoing call history data included in the phone data again after the transfer of the phone data is completed. The transfer control unit 2C executes the transfer control by controlling the data transfer connection processing unit 2B to transfer at least the outgoing call history data again after the transfer of the phone data is completed.

Furthermore, when a phone communication state of the mobile phone 10 is transitioned to the incoming call state while the phone data is being transferred, the transfer control unit 2C may execute the transfer control to transfer at least the incoming call history data included in the phone data again after the transfer of the phone data is completed. The transfer control unit 2C executes the transfer control by controlling the data transfer connection processing unit 2B to transfer at least the incoming call history data again after the transfer of the phone data is completed.

The transfer control unit 2C executes the transfer control by using, for example, the transfer management data. In the transfer management data, transfer criteria, each depending on the phone communication state and the type of phone data, are set in advance so that the transfer control described above can be executed. The transfer criteria include "transferable", "non-transferable", and priority.

FIG. 7 is a schematic diagram illustrating an example of the data structure of the transfer management data. The transfer management data is data representing whether each type of phone data can be transferred in the individual each phone communication state. For example, the transfer management data is data in which the phone communication state, the transferable/non-transferable information indicating whether each type of phone data can be transferred, and priority are associated with each other.

The priority means the transfer order in the corresponding phone communication state. The higher the priority, the earlier the transfer order. In FIG. 7, the priority is indicated by the number in the angle brackets "< >". The smaller the value, the higher the priority.

In the transfer management data, priorities are set in advance so that a higher priority is given to phone data of a type set to be transferable, than that given to phone data of a type set to be non-transferable. Furthermore, in the transfer management data, the priorities are set in advance such that a higher priority is given to phone data of a type with a smaller data amount while satisfying the priority settings described above.

The standby state is assumed to also include a call end state that is a state when the call ends. The incoming call state is assumed to also include an incoming call waiting state. In FIG. 7, the all history data is history data as a result of integrating the missed call history data, the incoming call history data, and the outgoing call history data. When the mobile phone 10 is configured to generate the all history data, the phone data further including the all history data is transferred to the hands-free device 1.

In FIG. 7, "switching at the transition source" means that transferable or non-transferable is determined in accordance with the phone communication state before the transition to the on-call state. In the transfer management data, as transferable/non-transferable information of the incoming call history data corresponding to the on-call state, information is registered indicating that the transfer cannot be performed when the transition to the on-call state via the incoming call state occurs, and can be performed when the transition to the on-call state via the outgoing call state occurs. In the transfer management data, as transferable/non-transferable information of the outgoing call history data corresponding to the on-call state, information is registered indicating that the transfer can be performed when the transition to the on-call state via the incoming call state occurs, and cannot be performed when the transition to the on-call state via the outgoing call state occurs. In the present embodiment, when the mobile phone 10 receives an incoming call in the concurrent connection state, the transfer control unit 2C may execute transfer control suitable for the phone data being transferred and the phone communication state after the transition, based on the transfer management data.

Figure 8:
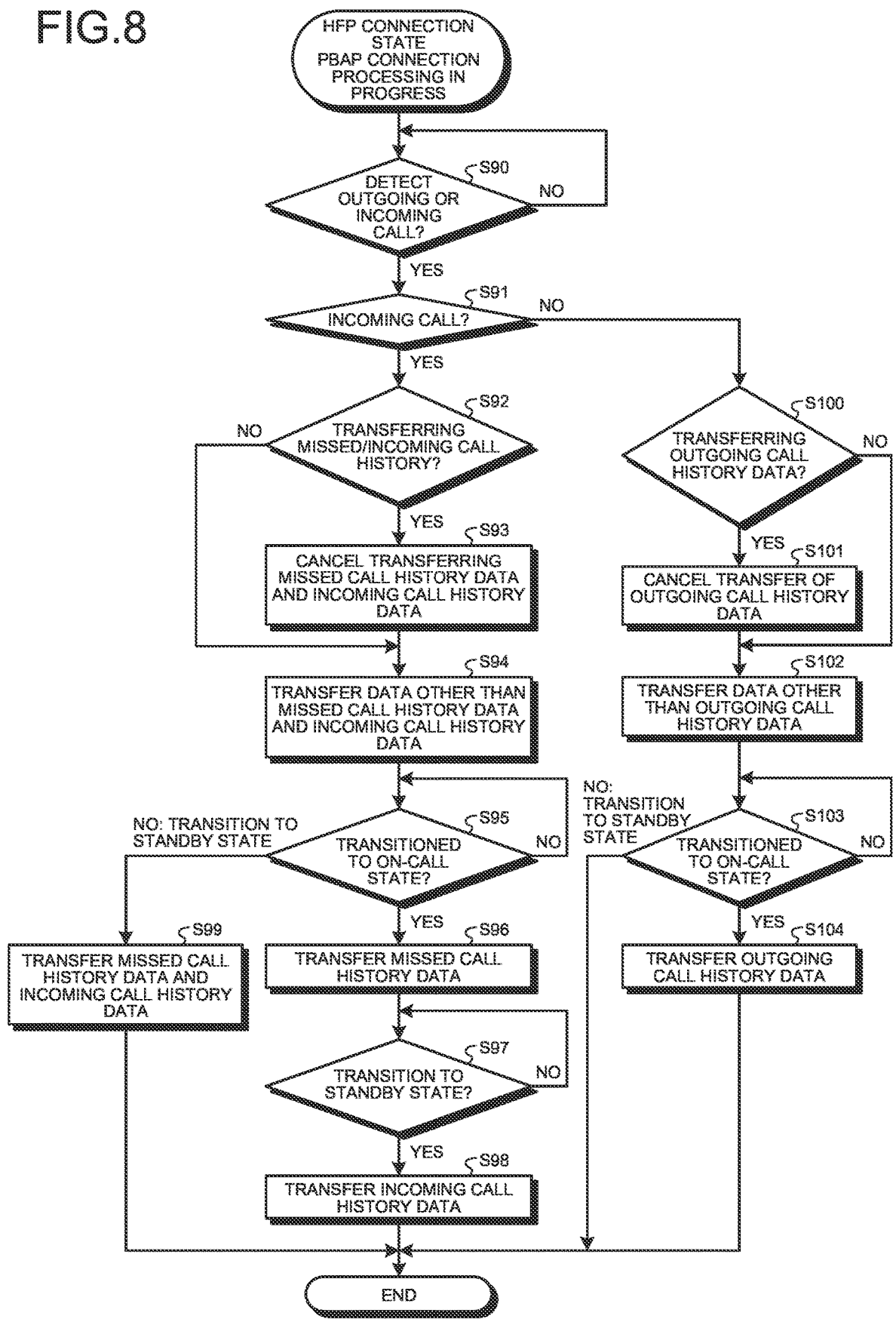
FIG. 8 is a flowchart illustrating a flow of transfer control according to the embodiment.

FIG. 8 is a flowchart illustrating an example of a flow of transfer control executed by the transfer control unit 2C.

The transfer control unit 2C determines whether an incoming call or an outgoing call is detected by the mobile phone 10 in the HFP and PBAP concurrent connection state (step S90). The transfer control unit 2C makes the determination in step S90 by determining whether the phone communication state notified from the mobile phone 10 using the HFP indicates the incoming call state or the outgoing call state.

When the mobile phone 10 is determined to have detected the incoming call or the outgoing call (step S90: Yes), the processing proceeds to step S91.

In step S91, the transfer control unit 2C determines whether an incoming call is detected (step S91). The transfer control unit 2C makes the determination in step S91 by determining whether the phone communication state notified from the mobile phone 10 using the HFP indicates the incoming call state. When it is determined that the incoming call has been detected (step S91: Yes), the processing proceeds to step S92.

In step S92, the transfer control unit 2C determines whether the missed call history data or the incoming call history data is being transferred from the mobile phone 10 to the hands-free device 1 (step S92). When a result of the determination in step S92 is No (step S92: No), the processing proceeds to step S94.

When the missed call history data or the incoming call history data is being transferred (step S92: Yes), the processing proceeds to step S93. In step S93, the transfer control unit 2C executes transfer control so as to stop the transfer of the missed call history data and the incoming call history data (step S93).

Then, the transfer control unit 2C executes transfer control to transfer phone data (outgoing call history data, phone book data) other than the missed call history data and the incoming call history data in descending order of priority indicated by the transfer management data (step S94). Thus, for example, the phone book data is transferred after the outgoing call history data is transferred from the mobile phone 10 to the hands-free device 1.

Next, the transfer control unit 2C determines whether the phone communication state has transitioned to any one of the on-call state or the standby state (step S95). When it is determined that the transition to the on-call state has occurred (the incoming call state has ended) (step S95: Yes), the processing proceeds to step S96. In step S96, the transfer control unit 2C executes transfer control to transfer the missed call history data (step S96). The transfer control unit 2C may transfer only the remaining missed call history data failed to be transferred due to the cancellation of the transfer.

Next, the transfer control unit 2C determines whether the transition to the standby state has occurred (step S97). When the transition to the standby state has occurred (the incoming call state has ended) (step S97: Yes), the processing proceeds to step S98. In step S98, the transfer control unit 2C performs transfer control to transfer the incoming call history data (step S98). The transfer control unit 2C may transfer only the remaining incoming call history data failed to be transferred due to the cancellation of the transfer. Then, this routine ends.

On the other hand, when the transition to the standby state is determined to have occurred in step S95 (step S95: No (transition to the standby state)), the processing proceeds to step S99. In step S99, the transfer control unit 2C executes transfer control to transfer the missed call history data and the incoming call history data (step S99). Then, this routine ends.

On the other hand, when it is determined that the outgoing call is detected in step S91 above (step S91: No), the processing proceeds to step S100.

In step S100, the transfer control unit 2C determines whether the outgoing call history data is being transferred from the mobile phone 10 to the hands-free device 1 (step S100). When a result of the determination in step S100 is No (step S100: No), the processing proceeds to step S102. When it is determined that the outgoing call history data is being transferred (step S100: Yes), the processing proceeds to step S101.

In step S101, the transfer control unit 2C executes transfer control to stop the transfer of the outgoing call history data (step S101).

Next, the transfer control unit 2C executes the transfer control to transfer phone data other than the outgoing call history data from the mobile phone 10 to the hands-free device 1 (step S102).

Next, the transfer control unit 2C determines whether the phone communication state has transitioned to any one of the on-call state or the standby state (step S103). When it is determined that the on-call state has transitioned (the outgoing call state has ended) (step S103: Yes), the processing proceeds to step S104. In step S104, the transfer control unit 2C executes the transfer control to transfer the outgoing call history data from the mobile phone 10 to the hands-free device 1 (step S104). The transfer control unit 2C may transfer only the remaining outgoing call history data failed to be transferred due to the cancellation of the transfer. Then, this routine ends.

On the other hand, when the transfer control unit 2C determines that the transition to the standby state has occurred (step S103: No (transitioned to the standby state)), this routine ends.

Figure 9:
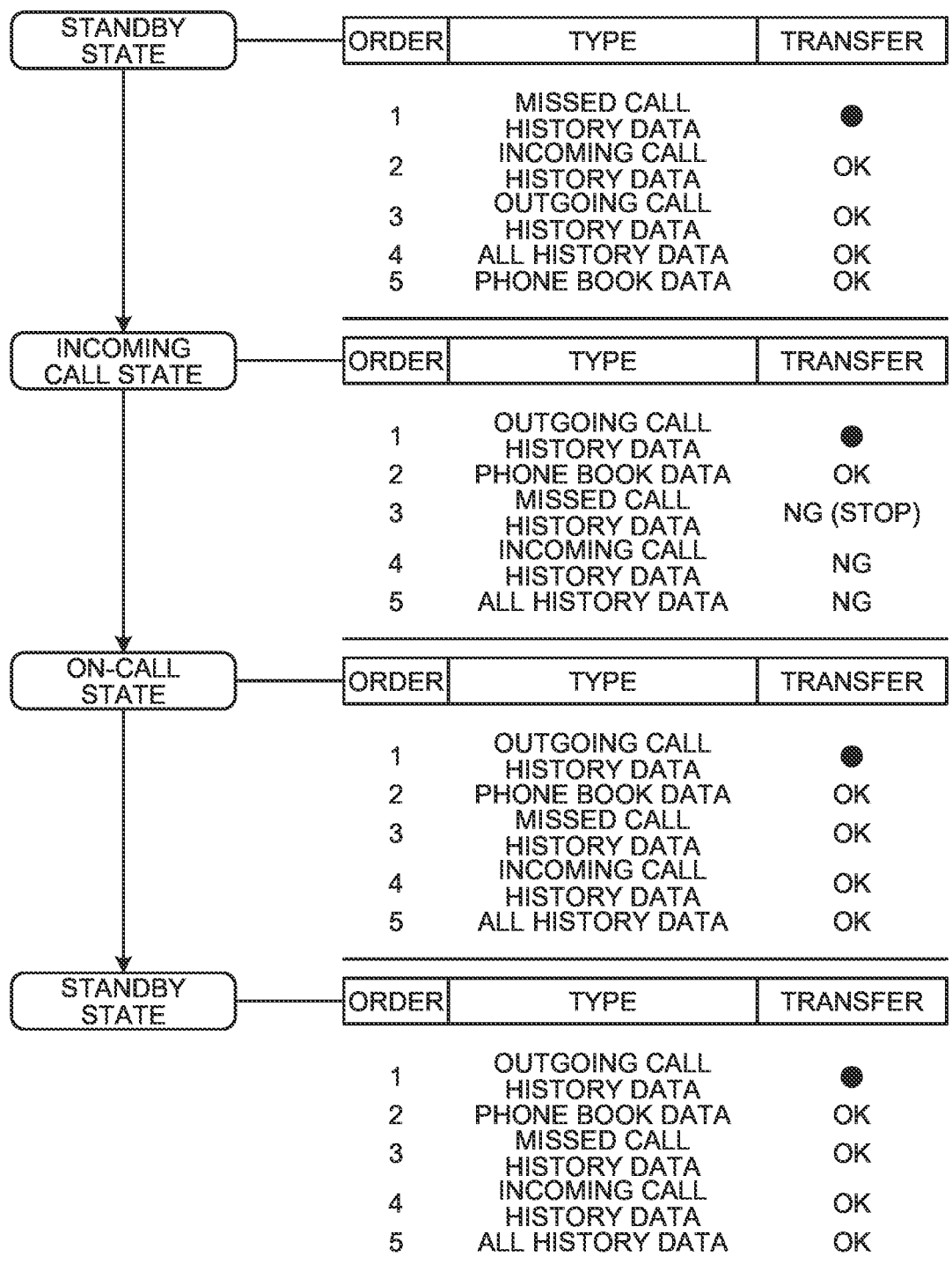
FIG. 9 is an explanatory diagram illustrating a flow of transfer control in a case where an incoming call occurs while phone data is being transferred according to the embodiment.

FIG. 9 is an explanatory diagram illustrating a flow of transfer control executed when the mobile phone 10 receives an incoming call while the phone data is being transferred.

As illustrated in FIG. 9, when the phone communication state of the mobile phone 10 is the standby state, the transfer control unit 2C executes transfer control to sequentially transfer the phone data in the transfer order illustrated in FIG. 9 based on the transfer management data. Specifically, the transfer control unit 2C executes transfer control on the data transfer connection processing unit 2B to transfer data from the mobile phone 10 to the hands-free device 1 in the order of missed call history data, incoming call history data, outgoing call history data, all history data, and phone book data.

When the phone communication state of the mobile phone 10 transitions from the standby state to the incoming call state, the transfer control unit 2C executes transfer control to sequentially transfer the phone data in the transfer order illustrated in FIG. 9 based on the transfer management data. Specifically, the transfer control unit 2C executes transfer control to stop the transfer of the missed call history data from the mobile phone 10 to the hands-free device 1, and transfer the outgoing call history data and the phone book data to the hands-free device 1 in this order.

When the phone communication state of the mobile phone 10 transitions from the incoming call state to the on-call state, the transfer control unit 2C executes transfer control to sequentially transfer the phone data in the transfer order illustrated in FIG. 9 based on the transfer management data. Specifically, the transfer control unit 2C executes transfer control to transfer data from the mobile phone 10 to the hands-free device 1 in the order of outgoing call history data, phone book data, missed call history data, incoming call history data, and all history data. The history data on the mobile phone 10 side may not be updated. Therefore, when the incoming call state transitions to the on-call state, the incoming call history data and the all history data may be non-transferable.

When the phone communication state of the mobile phone 10 transitions from the incoming call state to the on-call state, the transfer control unit 2C executes transfer control to sequentially transfer the phone data in the transfer order illustrated in FIG. 9 based on the transfer management data. Specifically, the transfer control unit 2C executes transfer control to transfer data from the mobile phone 10 to the hands-free device 1 in the order of outgoing call history data, phone book data, incoming call history data, missed call history data, and all history data.

The data amount of phone book data is larger than that of the history data. Therefore, the transfer control unit 2C may execute transfer control to transfer the phone book data after the history data.

In this manner, the transfer control unit 2C executes transfer control related to transfer of phone data from the mobile phone 10 to the hands-free device 1, in accordance with the phone data being transferred and the phone communication state after the transition. Thus, with the hands-free device 1 according to the present embodiment, the consistency of the phone data can be efficiently maintained between the hands-free device 1 and the mobile phone 10.

When a phone communication state of the mobile phone 10 is transitioned to the outgoing call state while any of the phone data is being transferred, the transfer control unit 2C may execute transfer control to transfer the outgoing call history data again after the transfer of the phone data being transferred is completed. In this case, the history data that is likely to have changed in accordance with the phone communication state after the transition can be selectively transferred again. Thus, with the hands-free device 1, the consistency of the phone data can be more efficiently maintained.

When a phone communication state of the mobile phone 10 is transitioned to the incoming call state while any of the phone data is being transferred, the transfer control unit 2C may execute transfer control to transfer the incoming call history data again after the transfer of the phone data being transferred is completed. In this case, the history data that is likely to have changed in accordance with the phone communication state after the transition can be selectively transferred again. Thus, with the hands-free device 1, the consistency of the phone data can be more efficiently maintained.

Next, concurrent connection processing after successful data transfer using the PBAP will be described.

With the hands-free device 1, the HFP and PBAP concurrent connection state is maintained after the data transfer using the PBAP is completed. Therefore, the hands-free device 1 can start data transfer using the PBAP at a predetermined timing. Thus, when the mobile phone 10 receives or makes a new incoming call or outgoing call, the latest phone data in the mobile phone 10 can be updated on the side of the hands-free device 1.

This will be described with reference to FIGS. 10 to 15.

In an assumed situation described with reference to FIGS. 10 to 15, the mobile phone 10 receives or makes an incoming call or an outgoing call after the HFP connection is established in S2 in FIG. 4 described above, and the incoming call history data and the outgoing call history data including the histories of the incoming call and the outgoing call is stored in the mobile phone 10. Furthermore, it is assumed that after the HFP connection is established in S2 of FIG. 4 described above, the mobile phone 10 executes the outgoing call processing via the Bluetooth communication unit 3 in response to an operation on the operation unit 4. In this case, the phone number as the call destination is sent from the hands-free device 1 to the mobile phone 10 via the Bluetooth communication unit 3. Thus, the outgoing call history data including this outgoing call is also stored in the mobile phone 10.

Figure 10:
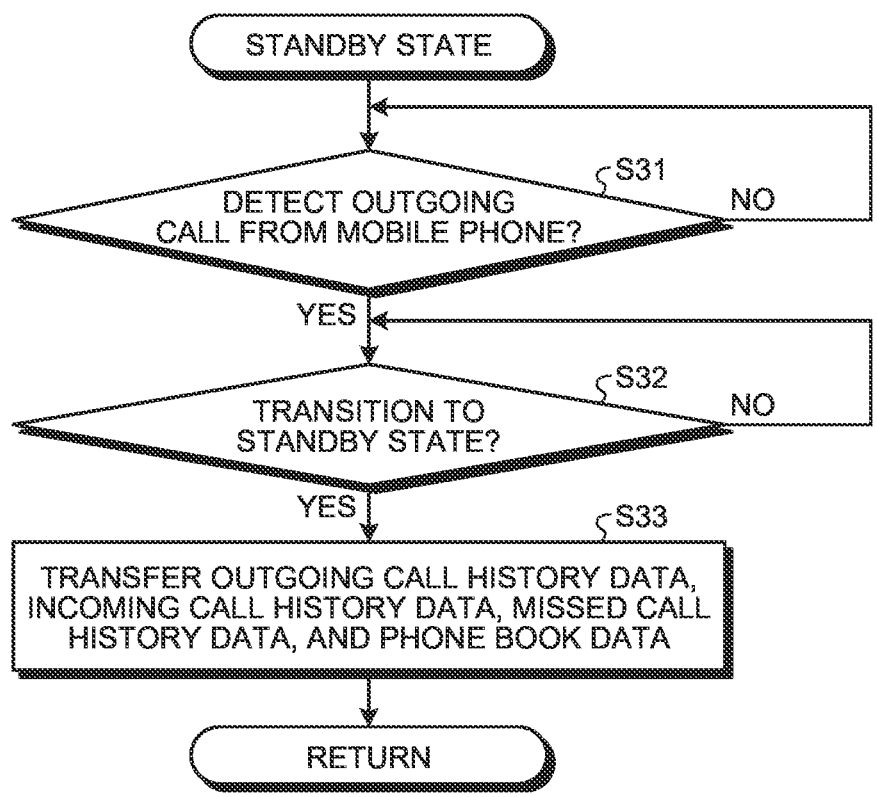
FIG. 10 is a flowchart illustrating a flow of transfer processing according to the embodiment.

FIG. 10 is a flowchart illustrating a flow of transfer processing executed by the hands-free device 1 when the mobile phone 10 executes the outgoing call processing in response to an operation on the operation unit of the mobile phone 10.

As described above, in the state where the HFP connection between the hands-free device 1 and the mobile phone 10 is established, the outgoing call processing can be executed in response to an operation on the operation unit 4 of the hands-free device 1. Furthermore, in a state where the HFP connection is established, a hands-free call can be made through the outgoing call processing in response to an operation on the operation unit of the mobile phone 10.

In this case, in the hands-free device 1, the history data needs to be updated to the latest state with the outgoing call history data as a result of this outgoing call processing acquired from the mobile phone 10. The hands-free device 1 can determine whether the outgoing call is one made by the mobile phone 10. Furthermore, the hands-free device 1 can also determine whether the outgoing call is from the mobile phone 10 by analyzing the phone communication state notified from the mobile phone 10.

Thus, the transfer control unit 2C determines whether an outgoing call has been made from the mobile phone 10 during the standby state (step S31: Yes). The transfer control unit 2C makes the determination in step S31 by determining whether the phone communication state notified from the mobile phone 10 indicates the outgoing call state.

When a result of the determination in step S31 is Yes (step S31: Yes), the processing proceeds to step S32. In step S32, the transfer control unit 2C determines whether the outgoing call state determined in step S31 has transitioned to the standby state (step S32). The transfer control unit 2C makes the determination in step S32 by determining whether the phone communication state notified from the mobile phone 10 using the HFP indicates a transition from the outgoing call state or the on-call state to the standby state.

When it is determined that the transition to the standby state has occurred (step S32: Yes), the processing proceeds to step S33. For example, the transition to the standby state is determined to have occurred in step S43 in the following cases: a case where the mobile phone 10 rejects the incoming call for example; when the mobile phone 10 on the caller side cancels the outgoing call for example; and when the call between the mobile phones 10 ends.

In step S33, the transfer control unit 2C acquires phone data (outgoing call history data, incoming call history data, missed call history data, and phone book data) from the mobile phone 10 (step S33).

Thus, the outgoing call history data, the incoming call history data, the missed call history data, and the phone book data can be acquired from the mobile phone 10 each time the outgoing call from the mobile phone 10 ends. Thus, the consistency between these pieces of phone data and the ones stored in the mobile phone 10 can be maintained.

The transfer control unit 2C may execute the transfer control in accordance with the phone data being transferred and the phone communication state after the transition as in FIG. 8 described above, also when the mobile phone 10 executes the outgoing call processing in response to an operation on the operation unit of the mobile phone 10.

Furthermore, although the transition to the standby state is determined in step S32 in FIG. 10, the transition to the outgoing call state may be determined in the step.

Figure 11:
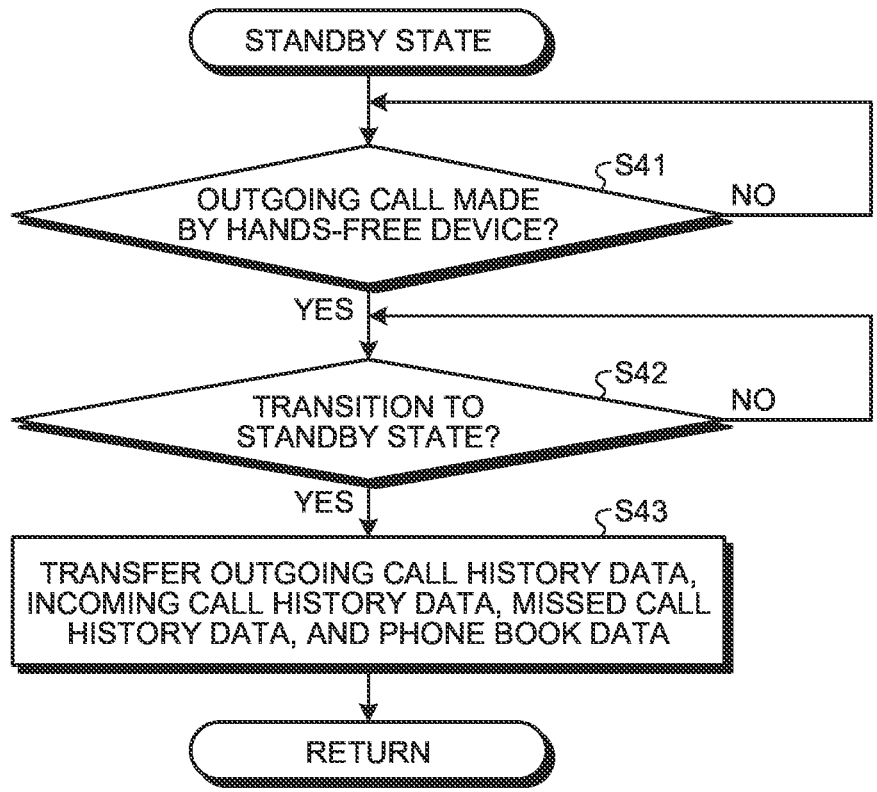
FIG. 11 is a flowchart illustrating a flow of transfer processing according to the embodiment.

FIG. 11 is a flowchart of a flow of transfer processing executed by the hands-free device 1 when the outgoing call processing is performed in response to an operation on the operation unit 4 of the hands-free device 1.

The transfer control unit 2C determines whether the hands-free device 1 has made an outgoing call, during the standby state (step S41: Yes).

When the result of the determination in step S41 is Yes (step S41: Yes), the processing proceeds to step S42. In step S42, the transfer control unit 2C determines whether the outgoing call state determined in step S41 has transitioned to the standby state (step S42). The transfer control unit 2C makes the determination in step S42 by determining whether the phone communication state notified from the mobile phone 10 using the HFP indicates a transition from the outgoing call state or the on-call state to the standby state.

When it is determined that the transition to the standby state has occurred (step S42: Yes), the processing proceeds to step S43. For example, the transition to the standby state is determined to have occurred in step S43 in the following cases: a case where the hands-free device 1 cancels the outgoing call therefrom for example; and a case where the mobile phone 10 cancels the outgoing call from the hands-free device 1, or the mobile phone 10 that is the destination of the outgoing call rejects the incoming call for example.

In step S43, the transfer control unit 2C acquires phone data (outgoing call history data, incoming call history data, missed call history data, and phone book data) from the mobile phone 10 (step S43).

Thus, the outgoing call history data, the incoming call history data, the missed call history data, and the phone book data can be acquired from the mobile phone 10 each time the outgoing call from the hands-free device 1 ends. Thus, the consistency between these pieces of phone data and the ones stored in the mobile phone 10 can be maintained.

The transfer control unit 2C may execute the transfer control in accordance with the phone data being transferred and the phone communication state after the transition as in FIG. 8 described above, also when the hands-free device 1 executes the outgoing call processing.

Furthermore, although the transition to the standby state is determined in step S42 in FIG. 11, the transition to the outgoing call state may be determined in the step.

Figure 12:
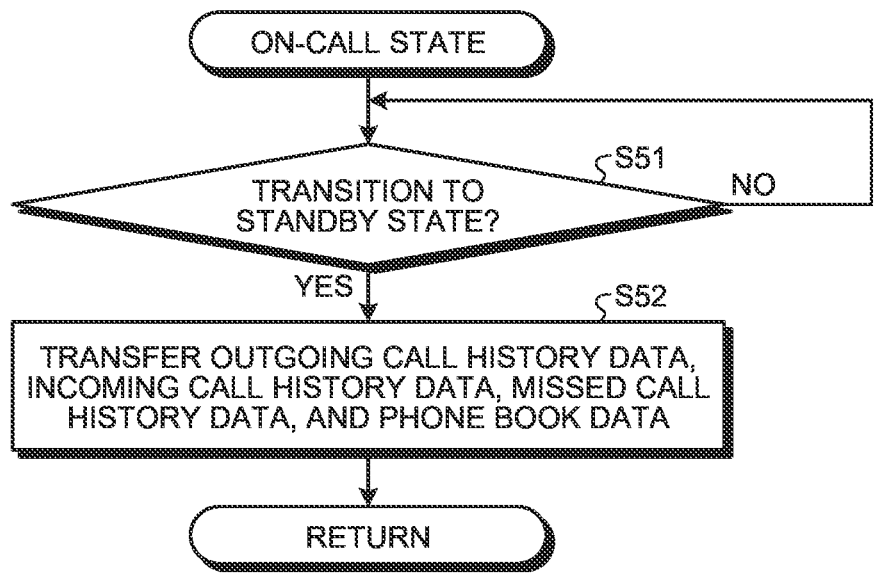
FIG. 12 is a flowchart illustrating a flow of transfer processing according to the embodiment.

FIG. 12 illustrates a modification of FIGS. 10 and 11. FIG. 12 is a flowchart of a flow of transfer processing executed by the hands-free device 1 when the on-call state transitions to the standby state in FIGS. 10 and 11.

The transfer control unit 2C determines whether the transition to the standby state has occurred when the hands-free device 1 and the mobile phone 10 are in the hands-free call state or when only the mobile phone 10 is in the on-call state (step S51). A result of the determination in step S51 is Yes when the hands-free device 1 ends the call, the mobile phone 10 ends the call, or when the call counterpart side ends the call.

When the result of the determination in step S51 is Yes (step S51: Yes), the processing proceeds to step S52. In step S52, the transfer control unit 2C acquires phone data (outgoing call history data, incoming call history data, missed call history data, and phone book data) from the mobile phone 10 (step S52).

Therefore, the phone data can be acquired from the mobile phone 10 each time the call ends. Therefore, the consistency between the phone data stored in the hands-free device 1 and the phone data stored in the mobile phone 10 can be maintained.

The transfer control unit 2C may execute the transfer control in accordance with the phone data being transferred and the phone communication state after the transition as in FIG. 8 described above, also when the on-call state transitions to the standby state.

Figure 13:
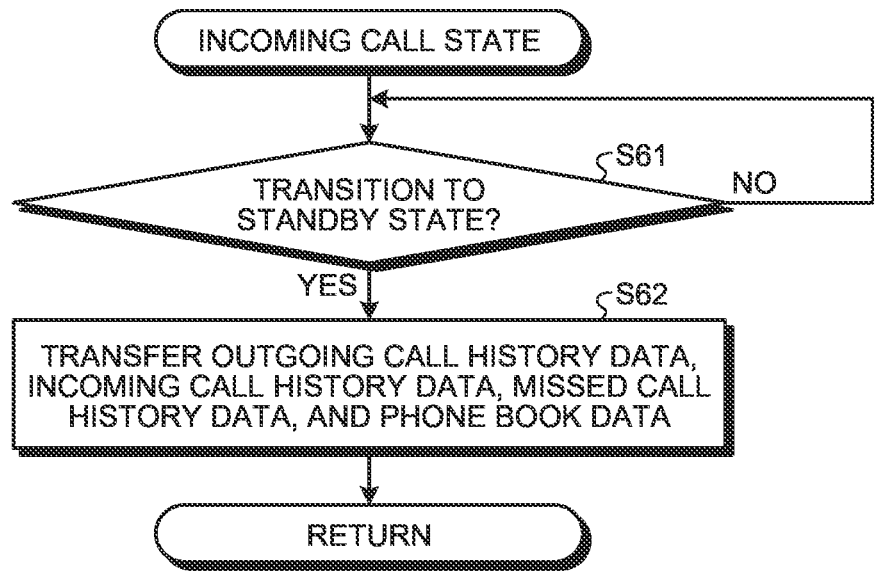
FIG. 13 is a flowchart illustrating a flow of transfer processing according to the embodiment.

FIG. 13 illustrates a modification of FIGS. 10 and 11. FIG. 13 is a flowchart of a flow of transfer processing executed by the hands-free device 1 when the incoming call state transitions to the standby state in FIGS. 10 and 11.

The transfer control unit 2C determines whether the transition to the standby state has occurred during the incoming call state (step S61) A result of the determination in step S61 is Yes when the transition to the standby state occurs as a result of the hands-free device 1 rejecting an incoming call, the mobile phone 10 rejecting an incoming call, the caller side canceling the outgoing call, the transition to the on-call state occurring after the incoming call is received and then the call ending, and the like.

When the result of the determination in step S61 is Yes (step S61: Yes), the processing proceeds to step S62. In step S62, the transfer control unit 2C acquires phone data (outgoing call history data, incoming call history data, missed call history data, and phone book data) from the mobile phone 10 (step S62).

Thus, the outgoing call history data, the incoming call history data, the missed call history data, and the phone book data can be acquired from the mobile phone 10 each time the incoming call ends. Therefore, the consistency between the phone data stored in the hands-free device 1 and the phone data stored in the mobile phone 10 can be maintained. The transfer control unit 2C may execute the transfer control in accordance with the phone data being transferred and the phone communication state after the transition as in FIG. 8 described above, also when the incoming call state transitions to the standby state.

The hands-free device 1 can also transfer data immediately after the transition from the standby state to the incoming call state. The incoming call includes a missed call which is an incoming call not answered, and an answered call resulting in transition from the incoming call state to the on-call state. Still, the phone communication state is finally transitioned to the standby state. Therefore, the transfer control unit 2C may acquire data representing whether the incoming call is a missed call or an answered call from the mobile phone 10 when the transition to the standby state occurs. In this case, the display control unit 2D can display a display screen indicating whether the incoming call is a missed call or an answered call on the display unit 5.

Figure 14:
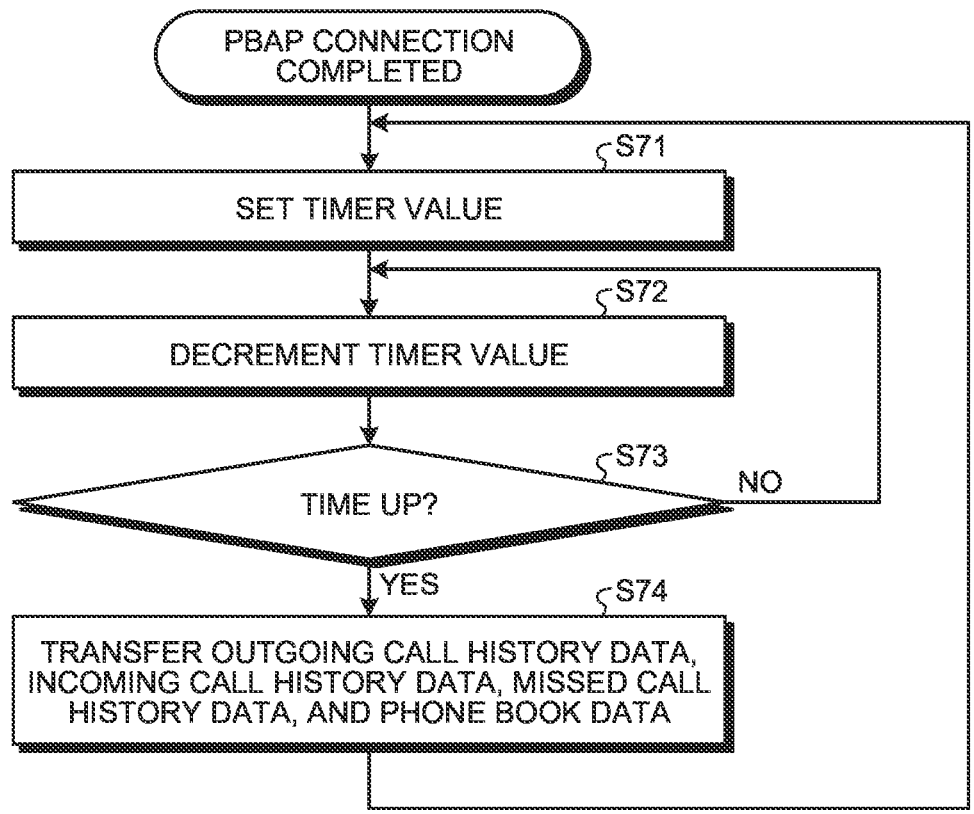
FIG. 14 is a flowchart illustrating a flow of data transfer timing control according to the embodiment.

The transfer control unit 2C may control the timing of data transfer by using a timer. FIG. 14 is a flowchart illustrating an example of a flow of timing control for data transfer using a timer value.

When the data transfer connection processing unit 2B establishes the PBAP connection, the transfer control unit 2C sets a timer value (step S71). The transfer control unit 2C decrements the set timer value at a predetermined time interval (step S72). When the transfer control unit 2C determines that the timer value has timed up (step S73: Yes), the processing proceeds to step S74.

In step S74, the transfer control unit 2C acquires outgoing call history data, incoming call history data, missed call history data, and phone book data from the mobile phone 10 (step S74).

With the processing illustrated in FIG. 14, the hands-free device 1 can periodically acquire the outgoing call history data, the incoming call history data, the missed call history data, and the phone book data from the mobile phone 10. Thus, with the hands-free device 1, the consistency between the phone data in the mobile phone 10 and the phone data in the hands-free device 1 can be maintained.

FIG. 15 is a flowchart illustrating a flow in a case where data transfer is triggered by an operation on the operation unit 4 by a user.

Upon receiving an instruction to change a display screen issued by the user by operating the operation unit 4, the display control unit 2D switches the display screen to display the history data or the phone book data in accordance with the change instruction. Specifically, the display control unit 2D determines the display screen has been transitioned to display any of the outgoing call history data, the incoming call history data, the missed call history data, and the phone book data (step S81).

When the result of the determination in step S81 is Yes (step S81: Yes), the transfer control unit 2C transfers the phone data from the mobile phone 10 (step S82).

In this case, each time the phone data displayed on the display unit 5 is switched, the phone data is automatically transferred from the mobile phone 10 to the hands-free device 1.

With reference to FIGS. 10 to 15, a mode of processing in which the hands-free device 1 periodically acquires the phone data from the mobile phone 10 is described. The phone book data included in the phone data requires some time for conversion into a vCard format. Furthermore, the data amount of the phone book data is larger than that of the history data. Thus, a large load may be imposed on the mobile phone 10 and the hands-free device 1, to lower the battery level of the mobile phone 10 and the hands-free device 1. Therefore, when a PBAP connection is established between the mobile phone 10 and the hands-free device 1, the hands-free device 1 may acquire the history data that is phone data other than the phone book data, from the mobile phone 10 at each predetermined timing. Thus, the processing executed by the mobile phone 10 and the hands-free device 1 can be reduced, whereby the lowering of their battery levels can be suppressed.

The transfer control unit 2C of the hands-free device 1 may execute transfer control to transfer only the incoming call history data and the missed call history data when an incoming call is received, and transfer only the outgoing call history data when an outgoing call is made. As a result, unnecessary data transfer can be omitted so that the processing of the mobile phone 10 can be reduced, whereby the lowering of its battery level can be suppressed.

The processes described with reference to FIGS. 10 to 15 may each be independently executed, or a plurality of the processes may be executed in combination.

A process executed by the hands-free device 1 for the data transferred from the mobile phone 10 to the hands-free device 1 will be described.

The following description is given under an assumption that the number of pieces of data included in the history data that can be stored in the working memory 6 of the hands-free device 1 is less than the number of pieces of data included in the history data automatically transferred from the mobile phone 10. Specifically, the description is given assuming that the number of pieces of data included in each of the outgoing call history data, the incoming call history data, and the missed call history data automatically transferred from the mobile phone 10 is 20. Furthermore, the description is given assuming that the number of pieces of data included in each of these types of history data that can be stored in the working memory 6 is five.

The display control unit 2D of the control unit 2 discards the outgoing call history data with an early outgoing call date and time in pieces of the outgoing call history data automatically transferred from the mobile phone 10. Then, the display control unit 2D stores five pieces of outgoing call history data with latest outgoing call dates and times in the working memory 6. Similarly, the display control unit 2D stores five pieces of other history data (incoming call history data, missed call history data) with latest outgoing call dates and times, in the working memory 6.

Then, the display control unit 2D may display the stored history data and the phone book data on the display unit 5 in response to an operation instruction issued by the user by operating the operation unit 4 or the like.

The incoming call history data is history data on an answered incoming call. The missed call history data is history data on an unanswered incoming call.

Thus, when displaying these types of history data at once in a list format, the display control unit 2D preferably displays at least one of an icon graphic representing an answered incoming call and an icon graphic representing a missed call which is an unanswered incoming call, for each corresponding history data. For example, a combination of graphics representing a phone and an arrow may be used as the icon graphic representing the answered incoming call. For example, a combination of graphics representing a phone and a cross mark "x" mark may be used as the icon graphic representing the missed call.

The data transfer connection processing unit 2B may designate the number of pieces of data (five in the present embodiment) to be automatically transferred from the hands-free device 1 to the mobile phone 10 when the PBAP connection is established, and the outgoing call history data, the incoming call history data, and the missed call history data with latest outgoing call dates and times/incoming call dates and times may be stored in the working memory 6 with a higher priority.

When transferring the phone book data to the hands-free device 1, the mobile phone 10 needs to convert the data format of the phone book data into a "vCard" data format as specified by the Bluetooth communication standard. Generally, the phone book data is updated less frequently than the history data such as the outgoing call history data and the incoming call history data.

Thus, the transfer control unit 2C may perform control to transfer the phone book data after the history data such as the outgoing call history data, the incoming call history data, and the missed call history data has been transferred from the mobile phone 10. Furthermore, the transfer control unit 2C may perform control to transfer the phone book data when a predetermined operation instruction is received due to an operation on the operation unit 4 by the user, after the history data has been transferred from the mobile phone 10.

In this case, history data updated frequently is transferred to the hands-free device 1 with priority over the phone book data that is less frequency updated. Furthermore, history data that can be transferred without the data conversion may be transferred from the mobile phone 10 to the hands-free device 1 earlier than the phone book data that requires the data conversion to be transferred. Therefore, the hands-free device 1 of the present embodiment can improve usability. Whether the phone book data is transferred may be selected by an operation on the operation unit 4 by the user.

Although the outgoing call history data, the incoming call history data, the missed call history data, and the phone book data are transferred automatically in the mode described above, a part of such data may be manually transferred. In this case, the hands-free device 1 may receive and set in advance, selection of manual transfer and automatic transfer from the user. Then, the hands-free device 1 may execute the PBAP processing according to this setting. For example, when the user has not set the automatic transfer, only the outgoing call history data, the incoming call history data, and the missed call history data are automatically transferred. On the other hand, when the phone book data is transferred by manual setting, only the phone book data is stored in the non-volatile storage memory 7. Then, the stored data may be read from the storage memory 7 and used as phone book data next time the hands-free device 1 is started.

The control unit 2 of the hands-free device 1 may store the outgoing call history data, the incoming call history data, and the phone book data transferred from the mobile phone 10, in the working memory 6, in such a manner that the data is separately stored for each mobile phone 10 as the transfer source. In this case, the control unit 2 generates a link key based on the ID of the transfer source mobile phone 10 and the ID of the hands-free device 1. Then, the control unit 2 may store the link key and the phone data transferred from the mobile phone 10 identified by the ID used for generating the link key in the working memory 6 in association with each other. The control unit 2 generates a link key using the ID of the mobile phone 10 each time the phone data is transferred from the mobile phone 10. Then, the control unit 2 may update the phone data by storing the transferred phone data in the working memory 6 in association with the generated link key.

With the phone data stored separately for each transfer source mobile phone 10, the hands-free device 1 can manage the phone data for each mobile phone 10. Furthermore, in this case, the phone book data needs not to be received from the mobile phone 10 each time power supply to the hands-free device 1 starts. Therefore, with the hands-free device 1, the user can swiftly use the phone book data corresponding to his/her own mobile phone 10.

Furthermore, usability of a phone book function can be dramatically improved.

In the present embodiment, the mode in which the phone data transferred from the mobile phone 10 is stored in the working memory 6 is described as an example. However, at least one type of phone data may be stored in the storage memory 7. For example, the history data may be stored in the working memory 6 and the phone book data may be stored in the storage memory 7. Furthermore, the history data and the phone book data may be stored in the storage memory 7.

As described above, the hands-free device 1 of the present embodiment includes the hands-free connection unit 2A, the data transfer connection processing unit 2B, and the transfer control unit 2C. The hands-free connection unit 2A executes hands-free connection processing to connect with the mobile phone 10 using the HFP for making a hands-free call. The data transfer connection processing unit 2B is connected to the mobile phone 10 using the PBAP for transferring phone data about a phone, and executes data transfer processing for receiving phone data transferred from the mobile phone 10. When the phone communication state of the mobile phone 10 transitions while the phone data is being transferred, the transfer control unit 2C executes transfer control for transfer suitable for the phone data being transferred and the phone communication state after the transition.

When the transfer control for the phone data from the mobile phone 10 to the hands-free device 1 is executed without taking the phone data being transferred and the phone communication state after the transition into consideration, the consistency of the phone data between the hands-free device 1 and the mobile phone 10 may be difficult to efficiently maintain.

For example, the phone data transfer processing might be restarted from the top, regardless of the phone data being transferred and the phone communication state. In this case, the transfer may take some time due to the occurrence of overhead. In addition, it may take some time to display the phone data on the display unit 5. Furthermore, it may be inefficient to restart the phone data transfer processing from the top after the transition to the standby state, regardless of the type of the phone data being transferred or the phone communication state.

On the other hand, with the hands-free device 1 according to the present embodiment, when the phone communication state of the mobile phone 10 transitions while the phone data is being transferred, transfer control related to transfer suitable for the phone data being transferred and the phone communication state after the transition is executed.

Thus, the consistency of the phone data between the hands-free device 1 and the mobile phone 10 can be efficiently maintained, compared with a case where the transfer control for the phone data from the mobile phone 10 to the hands-free device 1 is executed regardless of the phone data being transferred and the phone communication state after the transition.

Thus, the hands-free device 1 of the present embodiment can efficiently maintain the consistency of the phone data about a phone.

Furthermore, with the hands-free device 1 of the present embodiment, the HFP and PBAP concurrent connection is established, and data transfer using the PBAP is performed only when needed. Thus, with the hands-free device 1 of the present embodiment, the history data in the hands-free device 1 can be updated in accordance with the latest history data in the mobile phone 10, with no needless data transfer performed.

With the hands-free device 1, a Bluetooth communication line is established with the mobile phone 10, and the phone data automatically transferred from the mobile phone 10 is stored in the working memory 6. Thus, with the hands-free device 1, an outgoing call operation can be performed based on the outgoing call history data and the incoming call history data stored in the working memory 6. Thus, with the hands-free device 1, an outgoing call can be made with a desired phone number selected from the history data automatically transferred from the mobile phone 10. With the hands-free device 1, an outgoing call can be also made with a desired phone number selected from the outgoing call history data and the incoming call history data in the hands-free device 1. Therefore, in addition to the effects described above, the hands-free device 1 of the present embodiment can improve usability.

A computer program to be executed by a computer for performing the processing described above according to the embodiment may have a module structure including the plurality of functional units described above. In terms of actual hardware, for example, each of the functional units described above is loaded on a RAM (main storage) when a CPU (processor circuit or hardware processor) reads and executes the information processing program from a ROM or an HDD. Then, each of the plurality of functional units described above is generated on the RAM (main storage). A part or all of the plurality of functional units described above may be implemented using dedicated hardware such as an application specific integrated circuit (ASIC) or a field-programmable gate array (FPGA).

The embodiment described above is presented as an example, and not for limiting the scope of the present disclosure. The novel embodiment described above can be implemented in various other forms. Various omissions, replacements, and changes can be made without departing from the gist of the invention. The above-described embodiment is included in the scope or gist of the present disclosure, and is included in the scope of the invention described in the claims and the equivalent scope thereof.

For example, the hands-free device 1 may be formed by a hands-free dedicated device that mainly implements a hands-free function, or a device obtained by providing a hands-free function in a vehicle audio device that plays music, radio, or the like.

Furthermore, the hands-free device 1 may have portability, and thus may have a portable type configuration.

The configuration in which the mobile phone 10 and the hands-free device 1 performs Bluetooth communications should not be construed in a limiting sense. A configuration in which other types of short-range wireless communications or wired communications are performed may be employed.

Furthermore, the number of pieces of outgoing call history data and incoming call history data that can be stored in the working memory 6 may be one.

On the hands-free device 1, a plurality of pieces of outgoing call history data and a plurality of pieces of incoming call history data may be displayed at once, or may be displayed one by one. When the data is displayed one by one, for example, the latest data may be displayed first, and then the latest data may be displayed one by one in response to an operation on the operation unit 4.

In the configuration described in the present embodiment, the phone data is automatically transferred when the Bluetooth communication line is established between the mobile phone 10 and the hands-free device 1. Alternatively, a configuration in which automatic transfer of the phone data from the mobile phone 10 to the hands-free device 1 is triggered by an operation on the hands-free device 1 or the mobile phone 10 by the user may be employed.

With the present disclosure, the consistency of phone data about a phone can be efficiently maintained.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A hands-free device for a vehicle, the hands-free device comprising:
   a memory; and
   a hardware processor connected to the memory, the memory storing a program that, when executed by the hardware processor, causes the hands-free device to:
      establish a connection with a mobile phone using a hands-free communication protocol for making a hands-free call;
      establish a connection with the mobile phone using a data transfer protocol for transferring phone data about a phone to receive the phone data transferred from the mobile phone, and store the phone data into the memory;
      when a phone communication state of the mobile phone is transitioned while the phone data is being transferred, execute transfer control in accordance with transfer criteria, each depending on a type of the phone data being transferred and the phone communication state after the transition;
      when the phone communication state of the mobile phone is transitioned from a first state to an outgoing call state while the phone data, including outgoing call history data, is being transferred, stop the transfer of the outgoing call history data; and
      when the phone communication state of the mobile phone is transitioned from the first state to a second state being different from the outgoing call state and the first state, while the phone data, including the outgoing call history data, is being transferred, continue the transfer of the outgoing call history data.

2. The hands-free device according to claim 1, wherein the program, when executed by the hardware processor, further causes the hands-free device to:
   when the outgoing call state ends, execute the transfer of the outgoing call history data.

3. The hands-free device according to claim 1, wherein the program, when executed by the hardware processor, further causes the hands-free device to:
   when the phone communication state of the mobile phone is transitioned to an incoming call state while the phone data, including at least one of incoming call history data and missed call history data, is being transferred, stop the transfer of the at least one of incoming call history data and missed call history data.

4. The hands-free device according to claim 3, wherein the program, when executed by the hardware processor, further causes the hands-free device to:
when the incoming call state ends, execute the transfer of the at least one of incoming call history data and missed call history data.

5. The hands-free device according to claim 1, wherein the program, when executed by the hardware processor, further causes the hands-free device to:
when the phone communication state of the mobile phone is transitioned to a third state other than an incoming call state while the phone data, including at least one of incoming call history data and missed call history data, is being transferred, continue the transfer of the phone data.

6. The hands-free device according to claim 1, wherein the program, when executed by the hardware processor, further causes the hands-free device to:
when the phone communication state of the mobile phone is transitioned to the outgoing call state while the phone data is being transferred, transfer again the outgoing call history data included in the phone data after the transfer of the phone data is completed.

7. The hands-free device according to claim 1, wherein the program, when executed by the hardware processor, further causes the hands-free device to:
when the phone communication state of the mobile phone is transitioned to an incoming call state while the phone data is being transferred, transfer again incoming call history data included in the phone data after the transfer of the phone data is completed.

8. A data transfer method implemented by a computer on a vehicle, the data transfer method comprising:
establishing a connection with a mobile phone using a hands-free communication protocol for making a hands-free call;
establishing a connection with the mobile phone using a data transfer protocol for transferring phone data about a phone to receive the phone data transferred from the mobile phone, and storing the phone data into a memory of the computer;
when a phone communication state of the mobile phone is transitioned while the phone data is being transferred, executing transfer control in accordance with transfer criteria, each depending on a type of the phone data being transferred and the phone communication state after the transition;
when the phone communication state of the mobile phone is transitioned from a first state to an outgoing call state while the phone data, including outgoing call history data, is being transferred, stopping the transfer of the outgoing call history data; and
when the phone communication state of the mobile phone is transitioned from the first state to a second state being different from the outgoing call state and the first state, while the phone data, including the outgoing call history data, is being transferred, continuing the transfer of the outgoing call history data.

9. A non-transitory computer-readable recording medium on which programmed instructions are stored, the programmed instructions causing a computer on a vehicle to:
establish a connection with a mobile phone using a hands-free communication protocol for making a hands-free call;
establish a connection with the mobile phone using a data transfer protocol for transferring phone data about a phone to receive the phone data transferred from the mobile phone, and store the phone data into a memory on the computer;
when a phone communication state of the mobile phone is transitioned while the phone data is being transferred, execute transfer control in accordance with transfer criteria, each depending on a type of the phone data being transferred and the phone communication state after the transition;
when the phone communication state of the mobile phone is transitioned from a first state to an outgoing call state while the phone data, including outgoing call history data, is being transferred, stop the transfer of the outgoing call history data; and
when the phone communication state of the mobile phone is transitioned from the first state to a second state being different from the outgoing call state and the first state, while the phone data, including the outgoing call history data, is being transferred, continue the transfer of the outgoing call history data.

10. A hands-free device on a vehicle, the hands-free device comprising:
a memory; and
a hardware processor connected to the memory, the memory storing a program that, when executed by the hardware processor, causes the hands-free device to:
establish a connection with a mobile phone using a hands-free communication protocol for making a hands-free call;
establish a connection with the mobile phone using a data transfer protocol for transferring phone data about a phone to receive the phone data transferred from the mobile phone, and store the phone data into the memory;
when a phone communication state of the mobile phone is transitioned while the phone data is being transferred, execute transfer control in accordance with transfer criteria, each depending on a type of the phone data being transferred and the phone communication state after the transition;
when the phone communication state of the mobile phone is transitioned from a first state to an incoming call state, while the phone data, including at least one of incoming call history data and missed call history data, is being transferred, stop the transfer of the at least one of the incoming call history data and the missed call history data; and
when the phone communication state of the mobile phone is transitioned from the first state to a second state being different from the incoming call state and the first state, while the phone data, including the at least one of the incoming call history data and the missed call history data, is being transferred, continue the transfer of the at least one of incoming call history data and the missed call history data.

11. A data transfer method implemented by a computer on a vehicle, the data transfer method comprising:
establishing a connection with a mobile phone using a hands-free communication protocol for making a hands-free call;
establishing a connection with the mobile phone using a data transfer protocol for transferring phone data about a phone to receive the phone data transferred from the mobile phone, and storing the phone data into a memory of the computer;

when a phone communication state of the mobile phone is transitioned while the phone data is being transferred, executing transfer control in accordance with transfer criteria, each depending on a type of the phone data being transferred and the phone communication state after the transition;

when the phone communication state of the mobile phone is transitioned from a first state to an incoming call state, while the phone data, including at least one of incoming call history data and missed call history data, is being transferred, stopping the transfer of the at least one of the incoming call history data and the missed call history data; and when the phone communication state of the mobile phone is transitioned from the first state to a second state being different from the incoming call state and the first state, while the phone data, including the at least one of the incoming call history data and the missed call history data is being transferred, continuing the transfer of the at least one of the incoming call history data and the missed call history data.

12. A non-transitory computer-readable recording medium on which programmed instructions are stored, the programmed instructions causing a computer on a vehicle to:

establish a connection with a mobile phone using a hands-free communication protocol for making a hands-free call;

establish a connection with the mobile phone using a data transfer protocol for transferring phone data about a phone to receive the phone data transferred from the mobile phone, and store the phone data into a memory on the computer;

when a phone communication state of the mobile phone is transitioned while the phone data is being transferred, execute transfer control in accordance with transfer criteria, each depending on a type of the phone data being transferred and the phone communication state after the transition;

when the phone communication state of the mobile phone is transitioned from a first state to an incoming call state, while the phone data including at least one of incoming call history data and missed call history data is being transferred, stop the transfer of the at least one of the incoming call history data and the missed call history data; and when the phone communication state of the mobile phone is transitioned from the first state to a second state being different from the incoming call state and the first state, while the phone data, including the at least one of the incoming call history data and the missed call history data, is being transferred, continue the transfer of the at least one of the incoming call history data and the missed call history data.

* * * * *